(12) United States Patent
Vassilev et al.

(10) Patent No.: US 8,598,998 B2
(45) Date of Patent: Dec. 3, 2013

(54) ANIMAL COLLISION AVOIDANCE SYSTEM

(71) Applicant: Volacom AD, Sofia (BG)

(72) Inventors: Vassil Marinov Vassilev, Sofia (BG);
Lidia Ivanova Vassileva, Sofia (BG);
Michael Adam Karsch, New York, NY (US); Kiril Petkov Petkov, Sofia (BG); Petko Kirilov Petkov, Sofia (BG); John Charles Larre, New York, NY (US)

(73) Assignee: Volacom AD, Sofia (BG)

( * ) Notice: Subject to any disclaimer, the term of this patent is extended or adjusted under 35 U.S.C. 154(b) by 0 days.

(21) Appl. No.: 13/682,038

(22) Filed: Nov. 20, 2012

(65) Prior Publication Data

US 2013/0249218 A1    Sep. 26, 2013

Related U.S. Application Data

(63) Continuation of application No. PCT/IB2012/002338, filed on Oct. 22, 2012.

(60) Provisional application No. 61/638,618, filed on Apr. 26, 2012, provisional application No. 61/615,545, filed on Mar. 26, 2012.

(51) Int. Cl.
*G08B 3/10*    (2006.01)

(52) U.S. Cl.
USPC .................................... 340/384.2; 340/573.2

(58) Field of Classification Search
USPC ................... 340/573.2, 384.2; 342/22; 701/2
See application file for complete search history.

(56) References Cited

U.S. PATENT DOCUMENTS

| 4,769,794 A | 9/1988 | Beuter et al. |
| 5,714,926 A | 2/1998 | Edvinsson |
| 5,774,088 A * | 6/1998 | Kreithen ......................... 342/22 |
| 5,786,760 A | 7/1998 | Suzuki et al. |

(Continued)

FOREIGN PATENT DOCUMENTS

| DE | 202010010765 U1 | 11/2010 |
| GB | 2 284 971 A | 6/1995 |
| WO | WO 2010/023253 A1 | 3/2010 |

OTHER PUBLICATIONS

Allison N. L., and S. Destefano. Equipment and techniques for nocturnal wildlife studies, Wildlife Society Bulletin, 2006,34:1036-1044.

(Continued)

*Primary Examiner* — Jennifer Mehmood
*Assistant Examiner* — Rufus Point
(74) *Attorney, Agent, or Firm* — Sterne, Kessler, Goldstein & Fox P.L.L.C.

(57) ABSTRACT

The present disclosure is grounded in field study of habits of many species of animals, such as birds and bats to provide some examples, as well as their anatomical composition. This study has allowed an understanding of ingrained responses of these animals that can be modified by a biological understanding of physiology, sound and ultrasound technology, laser technology, and intelligent animal recognition. The unique coordination between these specialized technologies provides for animal casualty prevention in a sustainable way that achieves unprecedented success in diverting or deterring animals from their collision course with objects, such as wind turbines or aircraft to provide some examples. Moreover, the present disclosure does not substantially affect the well-being of the animals and does not introduce substantially harmful side-effects to the animals, their environment, and any surrounding human population.

25 Claims, 18 Drawing Sheets

(56) References Cited

U.S. PATENT DOCUMENTS

| | | | |
|---|---|---|---|
| 6,016,100 A | 1/2000 | Boyd et al. | |
| 6,250,255 B1* | 6/2001 | Lenhardt et al. | 119/713 |
| 6,285,630 B1* | 9/2001 | Jan | 367/139 |
| 6,407,670 B1* | 6/2002 | Dysarsz et al. | 340/573.2 |
| 6,575,597 B1 | 6/2003 | Cramer et al. | |
| 6,690,265 B2* | 2/2004 | Hagstrum | 340/384.3 |
| 7,028,633 B2 | 4/2006 | Pinton et al. | |
| 7,106,180 B1 | 9/2006 | Pompei | |
| 7,173,534 B1* | 2/2007 | Markham et al. | 340/573.2 |
| 7,522,473 B2 | 4/2009 | Zlotnik et al. | |
| 7,784,980 B2 | 8/2010 | Tsao et al. | |
| 8,087,335 B2* | 1/2012 | Shekarri | 89/1.11 |
| 8,123,476 B2 | 2/2012 | Stommel | |
| 2003/0058740 A1 | 3/2003 | Jincks | |
| 2005/0162978 A1* | 7/2005 | Lima | 367/139 |
| 2008/0298962 A1* | 12/2008 | Sliwa | 416/31 |
| 2009/0034369 A1 | 2/2009 | Hill | |
| 2009/0120374 A1 | 5/2009 | Hansen | |
| 2010/0110838 A1 | 5/2010 | Götz et al. | |
| 2010/0201525 A1* | 8/2010 | Bahat et al. | 340/573.2 |
| 2011/0144829 A1* | 6/2011 | Kim et al. | 701/2 |
| 2011/0163694 A1 | 7/2011 | Donners | |
| 2012/0328178 A1* | 12/2012 | Remiszewski et al. | 382/133 |

OTHER PUBLICATIONS

Boonstra, R., J. M. Eadie, C.J. Krebs, and S. Boutin. Limitations of far infrared thermal imaging in locating birds, Journal of Field Ornithology, 1995, 66:192-198.

Conway, C. J., W. R. Eddleman, S. H. Anderson, and L. R. Hanebury, Seasonal changes in Yuma clapper rail vocalization rate and habitat use, Journal of Wildlife Management, 1993, 57:282-290.

Croon, G. W., D. R. McCullough, C. E. Olson, Jr., and L. M. Queal, Infrared scanning techniques for big game censusing, Journal of Wildlife Management, 1968, 32:751-759.

Cummings G. E., and O. H. Hewitt, Capturing waterfowl and marsh birds at night with light and sound, Journal of Wildlife Management, 1964,28:120-126.

Desholm, M., A. D. Fox, P. D. L. Beasley, and J. Kaglerl, Remote techniques for counting and estimating the number of bird-wind turbine collisions at sea: a review, 2006, Ibis 148:76-89.

Ditchkoff, S. S., J. B. Raglin, J. M. Smith, and B. A. Cillier, Capture of white-tailed deer fawns using thermal imaging technology, Wildlife Society Bulletin, 2005, 33:1164-1168.

Drake, D., C. Aquila, and G. Huntington, Counting a suburban deer population using forward-looking infrared radar and road counts, Wildlife Society Bulletin, 2005,33:656-661.

Flores R. E., and W. R. Eddleman, California black rail use of habitat in southwestern Arizona, Journal of Wildlife Management, 1995, 59:357-363.

Focardi, S., A. M. DeMarinis, M. Rizzotto, and A. Pucci, Comparative evaluation of thermal infrared imaging and spotlighting to survey wildlife, 2001,Wildlife Society Bulletin 29:133-139.

Galligan, E. W., G. S. Bakken, and S. L. Lima, Using a thermographic imager to find nests of grassland birds, Wildlife Society Bulletin, 2003, 31:865-869.

Garner, D. L., H. B. Underwood, and W. F. Porter, Use of modern infrared thermography for wildlife population surveys, Environmental Management, 1995, 19:233-238.

Glahn, J. F.; G. Ellis; P. Fioranelli; and B.S. Dorr, "Evaluation of moderate and low-powered lasers for dispersing double-crested cormorants from their night roosts," 2000, *Wildlife Damage Management Conferences-Proceedings*, Paper 11. http://digitalcommons.unl.edu/iewdm_wdmconfproc/11.

Graves, H. B., E. D. Bellis, and W. M. Knut, Censusing white-tailed deer by airborne thermal infrared imagery, Journal of Wildlife Management, 1972, 36:875-884.

Haroldson, B. S., E. P. Wiggers, J. Beringer, L. P. Hansen, and J. B. McAninch, Evaluation of aerial thermal imaging for detecting white-tailed deer in a deciduous forest environment, Wildlife Society Bulletin, 2003, 31:1188-1197.

Havens K. J., and E. J. Sharp, Using thermal imagery in the aerial survey of animals, Wildlife Society Bulletin, 1998, 26:17-23.

Hon, T., R. R. Odom, and D. P. Belcher, Results of Georgia's clapper rail banding program, Proceedings of the Annual Conference Southeastern Association of Fish and Wildlife Agencies, 1977, 31:72-76.

Kearns, G. D., N. B. Kwartin, D. F. Brinker, and G. M. Haramis, Digital playback and improved trap design enhances capture of migrant soras and Virginia rails, Journal of Field Ornithology, 1998, 69:466-473.

Legare, M. L., W. R. Eddleman, P. A. Buckley, and C. Kelly, The effectiveness of tape playback in estimating black rail density, Journal of Wildlife Management, 1999, 63:116-125.

Perkins, M., The use of stable isotopes to determine the ratio of resident to migrant king rails in Southern Louisiana and Texas, Thesis, 2007, Louisiana State University, Baton Rouge, USA.

Roth, R. R., J. D. Newsom, T. Joanen, and L. L. McNease, The daily and seasonal behavior patterns of the clapper rail (*Rallus logirostris*) in the Louisiana coastal marshes, Proceedings of the Annual Conference Southeastern Association of Game and Fish Commissioners, 1972, 26:136-147.

Schumake, S. A., "Electronic Rodent Repellent Devices: A Review of Efficacy Test Protocols and Regulatory Actions,"1995, *National Wildlife Research Center Repellents Conference 1995*. Paper 34. http://digitalcommons.unl.edu/nwrcrepellants/34.

Stewart, R. E., Clapper rail populations of the middle Atlantic states, Transactions of the North American Wildlife Conference, 1951, 16:421-430.

Wiggers E. P., and S. F. Beckerman, Use of thermal infrared sensing to survey white-tailed deer populations, 1993, Wildlife Society Bulletin 21:263-268.

Zembal R., and B. W. Massey, To catch a clapper rail-twice, North American Bird Bander, 1983, 8:144-148.

The International Search Report for International Patent Application No. PCT/IB2012/002338, mailed Apr. 11, 2013, 5 pages.

The Written Opinion for International Patent Application No. PCT/IB2012/002338, mailed Apr. 11, 2013, 8 pages.

English Description for German Patent Application No. DE20102010765U, filed Nov. 4, 2010, downloaded from http://v3.espacenet.com, on Apr. 16, 2013, 1 page.

* cited by examiner

ANIMAL COLLISION AVOIDANCE SYSTEM

CROSS-REFERENCE TO RELATED APPLICATIONS

The present application is a continuation of PCT/IB2012/002338, filed on Oct. 22, 2012, which claims the benefit of U.S. Provisional Patent Appl. No. 61/638,618, filed Apr. 26, 2012 and U.S. Provisional Patent Appl. No. 61/615,545, filed Mar. 26, 2012, each of which is incorporated herein by reference in its entirety.

BACKGROUND

1. Field of Disclosure

The present disclosure relates to deterring an object from entering into an environment and/or diverting a trajectory of the object away from the environment, and more specifically, to deterring a bird and/or a bat from entering into a wind farm and/or an airport and/or diverting a trajectory of the bird and/or the bat away from the wind farm and/or the airport.

2. Related Art

Wind turbines that produce clean energy present significant benefits to the environment and to society in general. However, there are significant collateral issues concerning the safety of birds and bats that arise from their use. There have been worldwide instances where large numbers of birds and bats have been killed and where rare protected species of both are hurt or fatally damaged resulted in an outcry that has been very loud and very clear. There are hundreds of instances where the press has reported significant maiming and killing of rare and not so rare species of birds and bats.

First and foremost in the minds of profit oriented companies that operate in this field is the production of energy at the lowest cost possible and with the least interference with their operations by concerned law makers and citizens. Over the years, the killing and maiming of birds and bats of all species has haunted the industry and has caused delay and great expense in bringing online new wind energy sites. Solutions satisfactory to all concerned have proven to be elusive.

The commonly used solutions are not solving the problem. Many solutions have been tested without long-term success because all of the solutions are using a single methodology to deal with a very complex biological and ingrained series of habits that are unique to birds and bats.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears.

Figure 12:
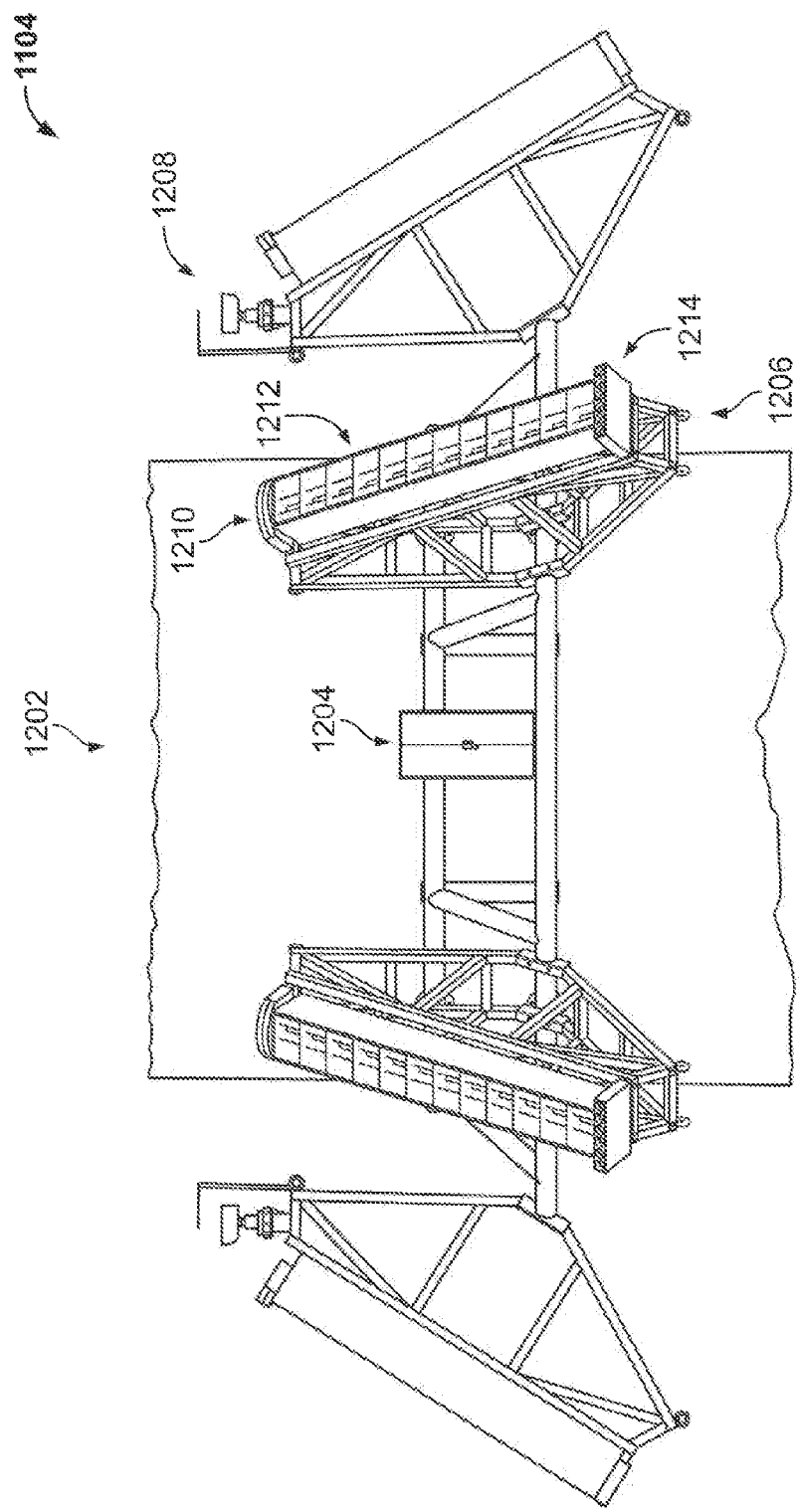
Figure 13:
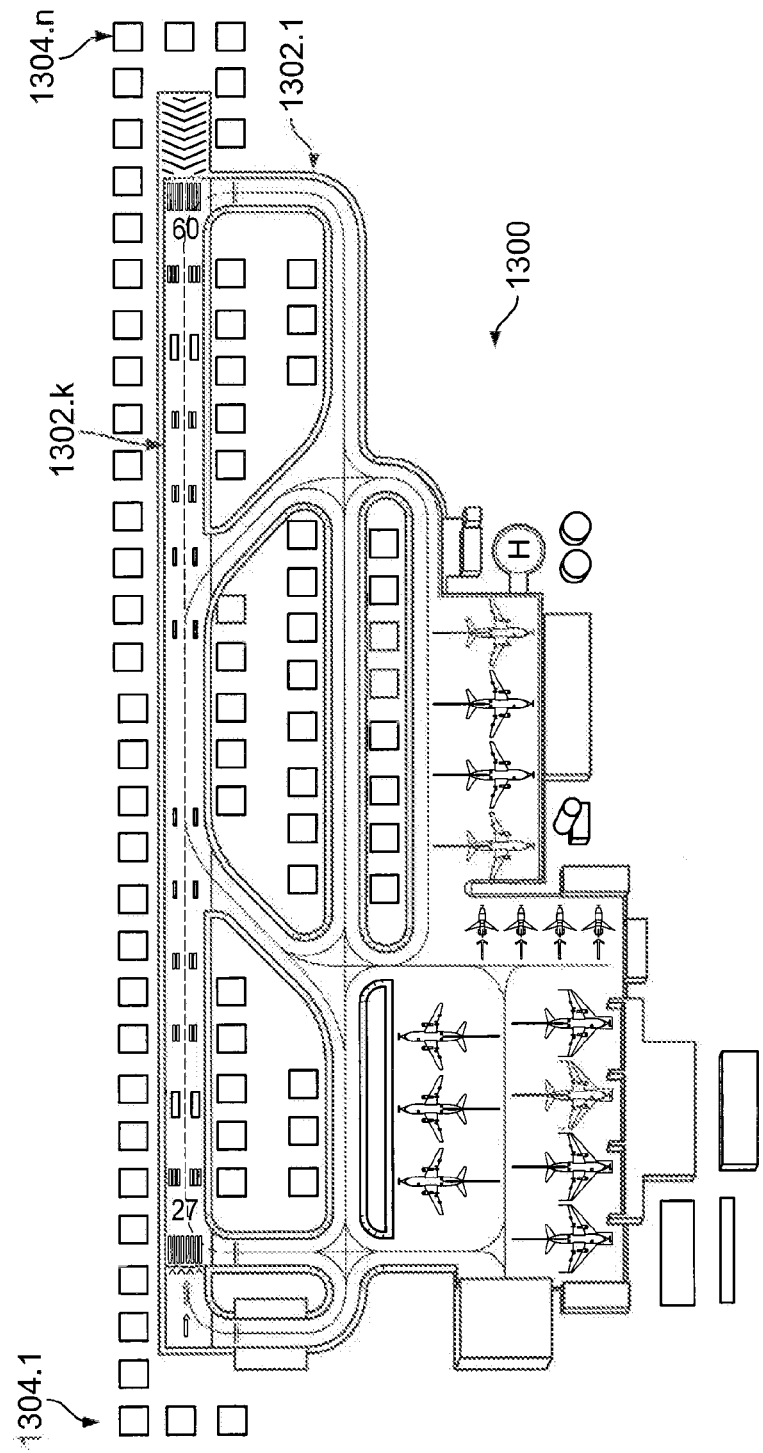
Figure 14:
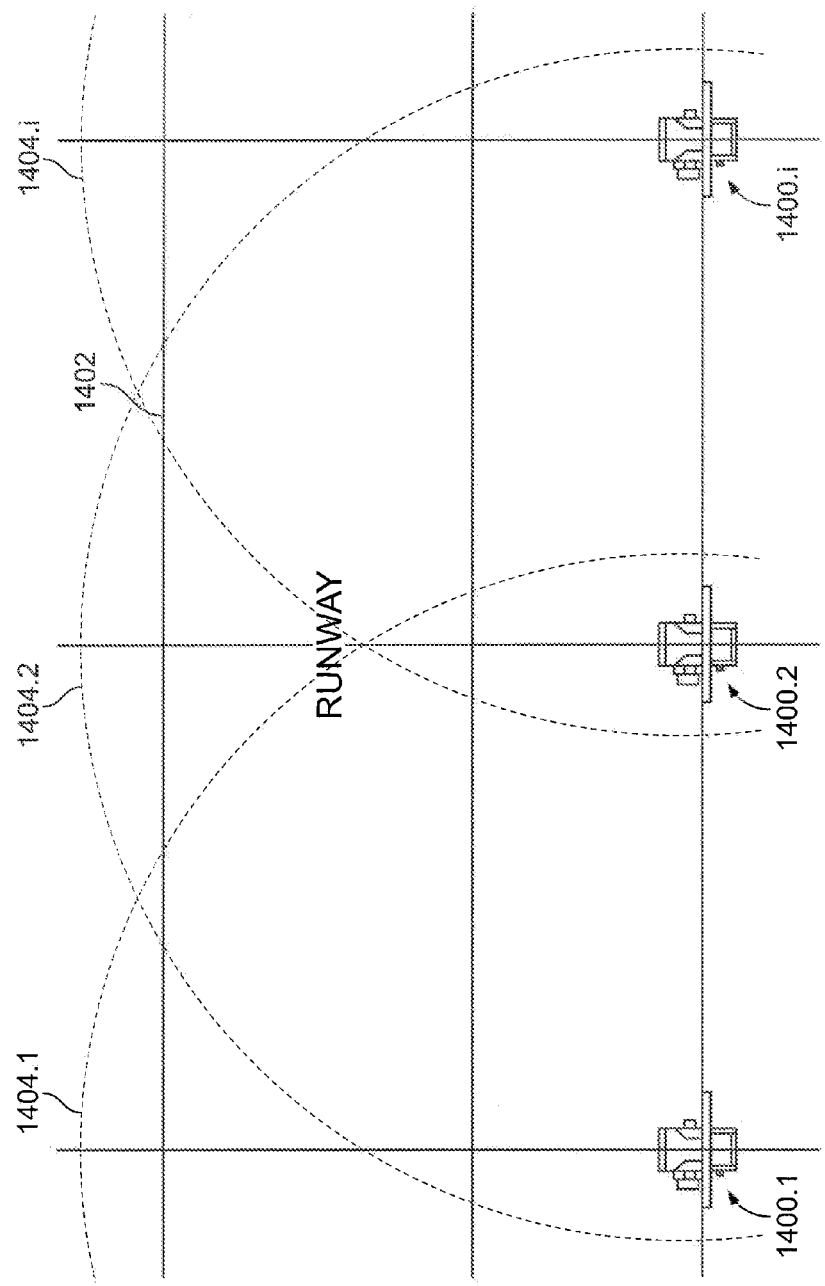
Figure 15:
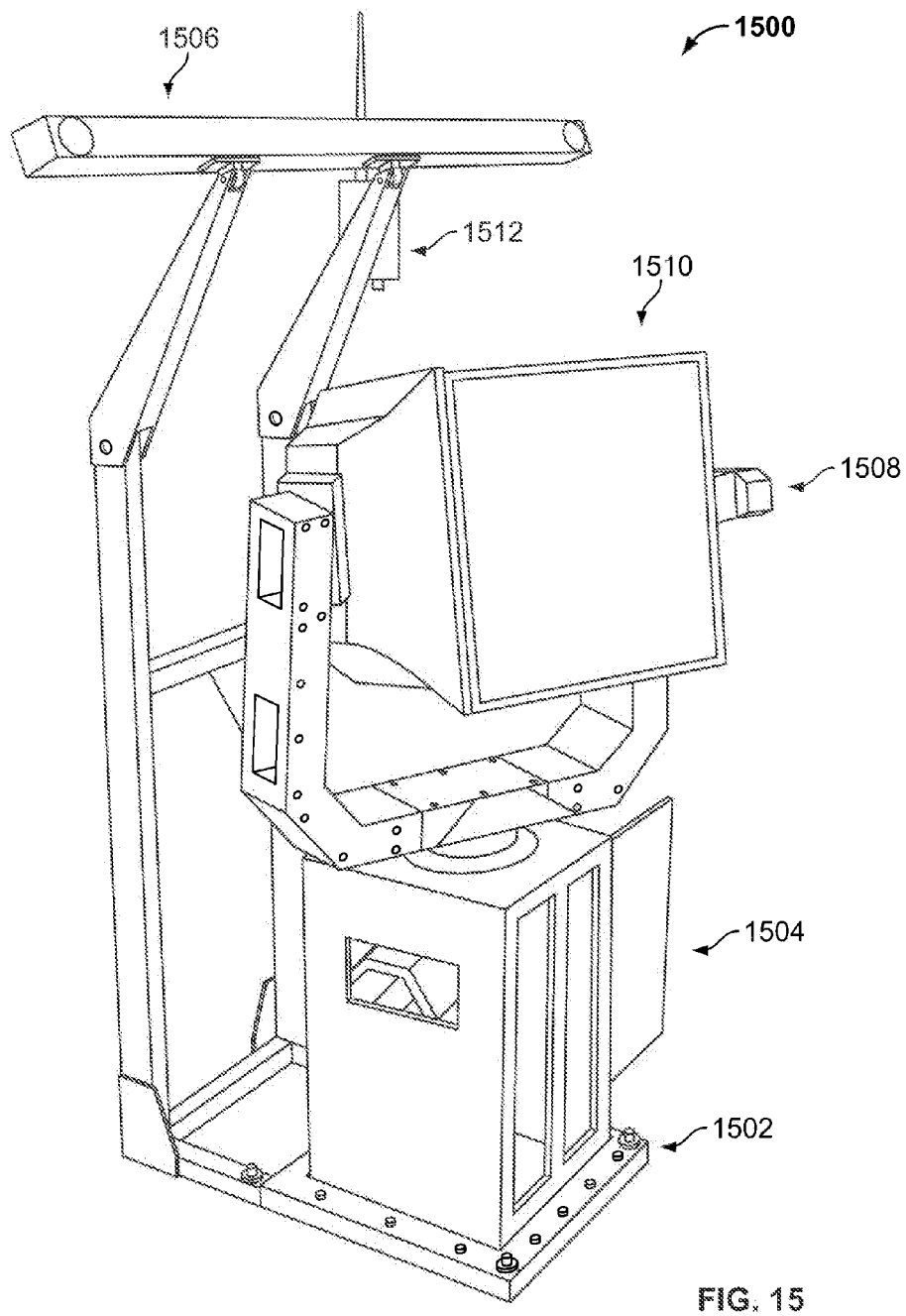
Figure 16:
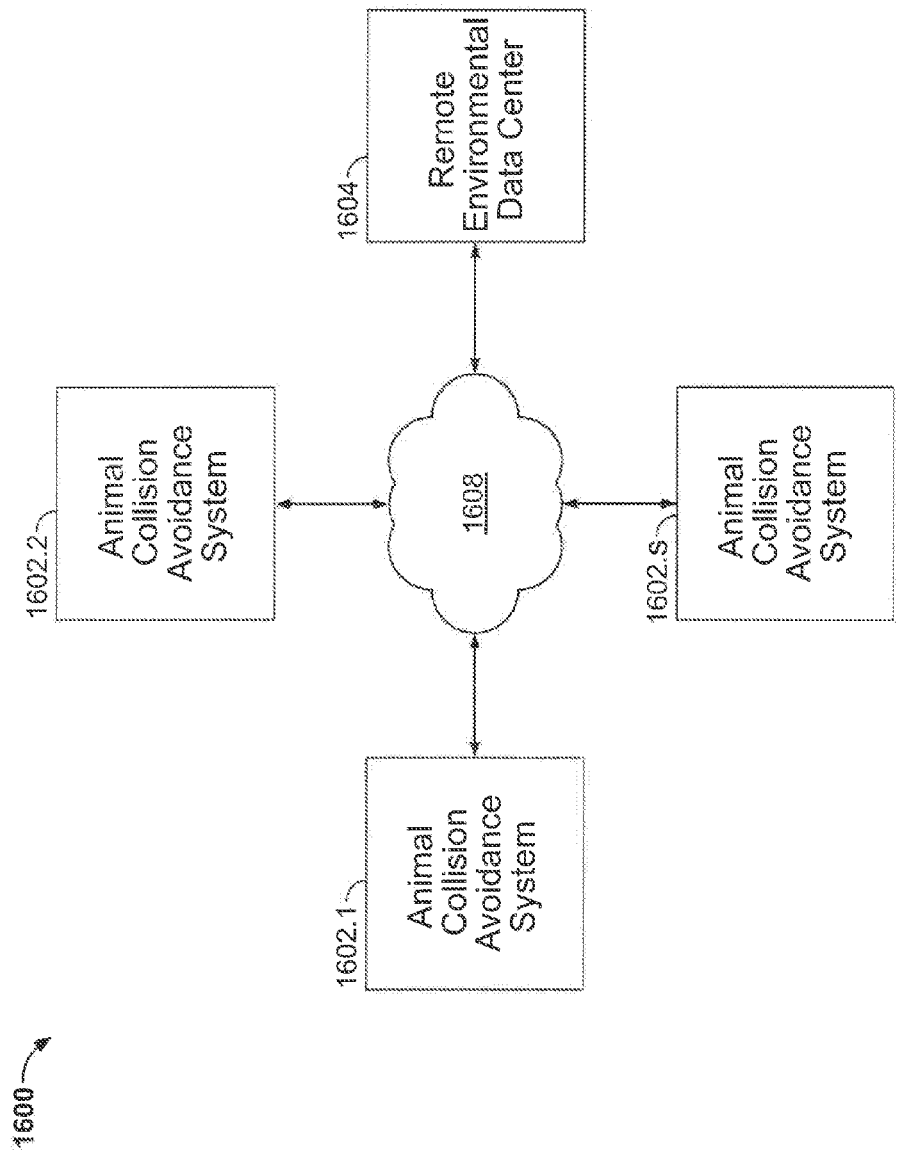
Figure 17:
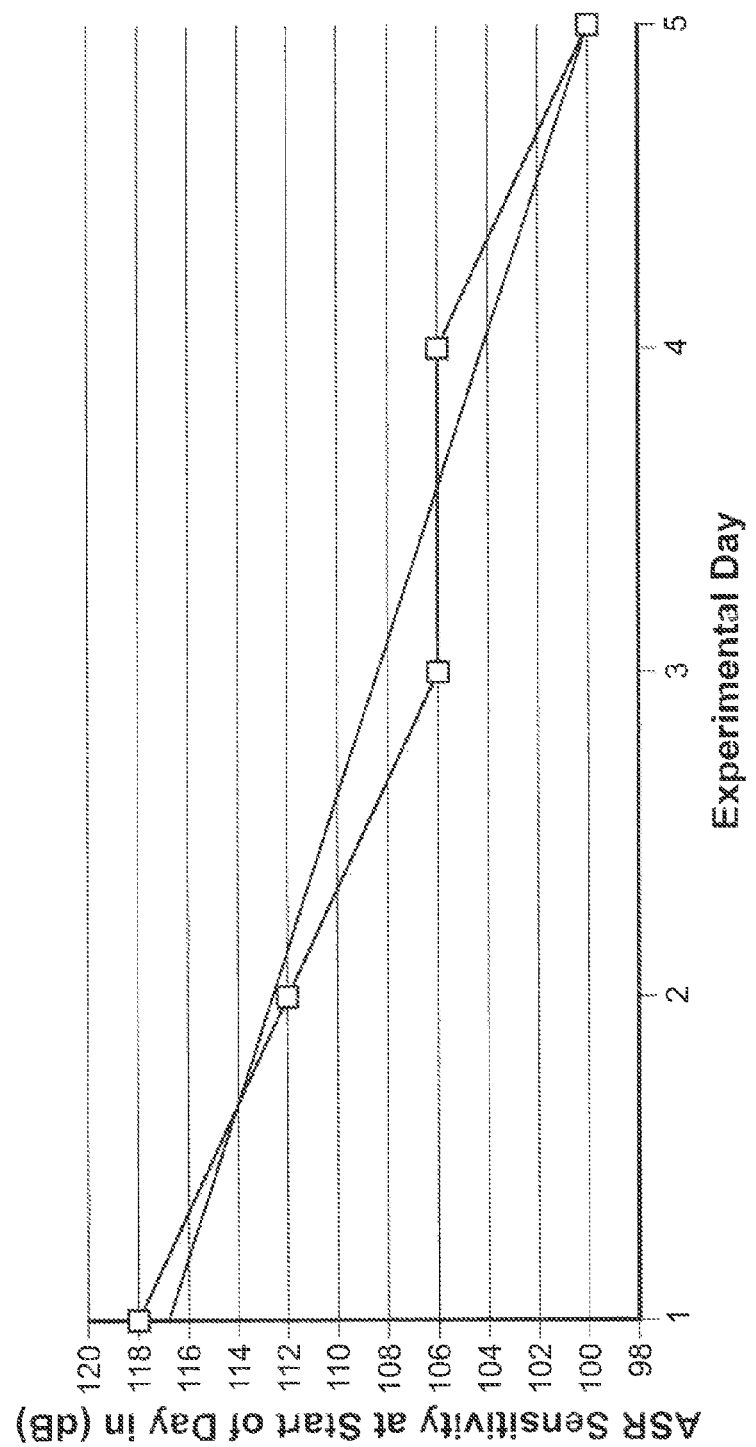

FIG. 12 further illustrates the animal collision avoidance system that can be installed within a wind turbine according to an exemplary embodiment of the present disclosure;

FIG. 13 illustrates an exemplary installation of the animal collision avoidance system within an airport according to an exemplary embodiment of the present disclosure;

FIG. 14 further illustrates configuration and arrangement of various animal collision avoidance systems to proximate to various airport runways within the airport according to an exemplary embodiment of the present disclosure;

FIG. 15 further illustrates one of the animal collision avoidance systems that can be installed within the airport according to an exemplary embodiment of the present disclosure;

FIG. 16 illustrates a communicatively coupled network of animal collision avoidance systems according to an exemplary embodiment of the present disclosure; and FIG. 17 illustrates an effect of multiple exposures of the exemplary electronically generated acoustic sounding signal having the exemplary synthetic sounding signal according to an embodiment of the present disclosure.

The present disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment can net necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or Characteristic in connection with other exemplary embodiments whether or not explicitly described.

The exemplary embodiments described herein are provided for illustrative purposes, and are not limiting. Other exemplary embodiments are possible, and modifications can be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Overview

Generally, the present disclosure is grounded in field study of habits of many species of animals, such as birds and bats to provide some examples, as well as their anatomical composition. This study has provided an understanding of ingrained responses of these animals that can be modified by a biological understanding of physiology, use of thermal sensors, sound and ultrasound technology, laser technology and intelligent animal recognition. The unique coordination between these specialized technologies provides for animal casualty prevention in a sustainable way that achieves unprecedented success in diverting or deterring animals from their collision course with objects, such as wind turbines or aircraft to provide some examples. Moreover, the present disclosure does not substantially affect the well-being of the animals and does not introduce substantially harmful side-effects to the animals, their environment, and any surrounding human population.

Exemplary Animal Collision Avoidance System

Figure 1:
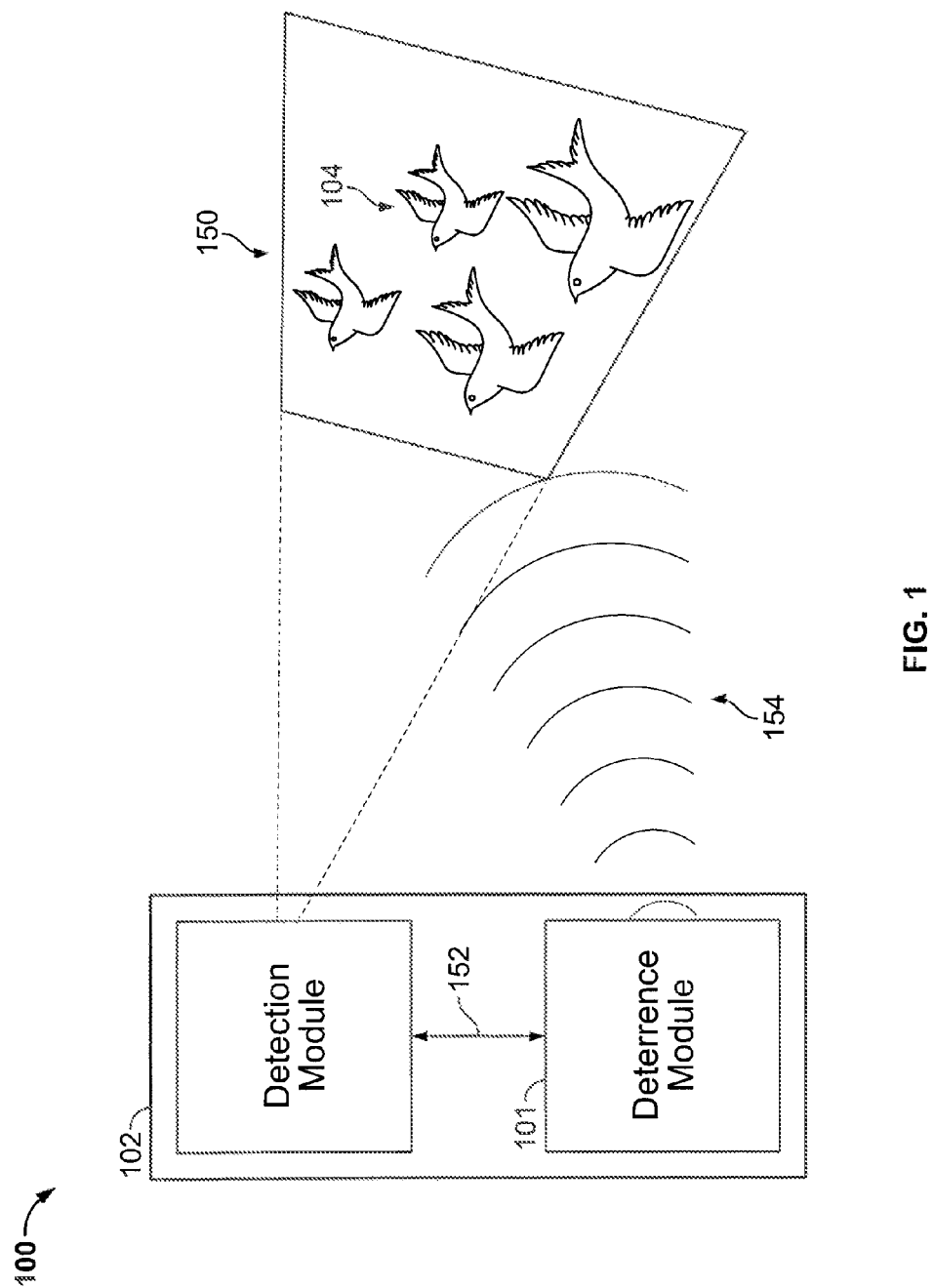
FIG. 1 illustrates an exemplary animal collision avoidance system in accordance with an exemplary embodiment of the present disclosure.

FIG. 1 illustrates an exemplary animal collision avoidance system in accordance with an exemplary embodiment of the present disclosure. Generally, an animal collision avoidance system 102 detects a presence of an object 104 within an environment 100. The object 104 can include one or more animals, one or more other objects other than animals, or any combination thereof. The environment 100 can represent a wind turbine, a wind farm, an airport runway, or a physical space next to airport runway, an oil sand site, an oil rig, a ship, farmland, an open pit mining site, a military base, an area of industrial hazard, a food storage facility, a chemical facility a golf course, a hospital, a building, a parking lot, and/or any other suitable environment that will be apparent to those skilled in the relevant art(s) without departing from the spirit and scope of the present disclosure. After detection of the object within the environment 100, the anrimal collision avoidance system 102 recognizes the object 104. Thereafter, the animal collision avoidance system 102 provides one or more electronically generated deterrent signals to deter the object 104 from entering into the environment 100 and/or to divert a trajectory of the object 104 away from the environment 100. The animal collision avoidance system 102 includes a detection module 106 and a deterrence module 108.

The detection module 106 detects for the presence of the object 104 within a portion of the environment 100. The detection module 106 can include one or more sensors to detect energy, such as body tenmperatire, light reflection, infrared light reflection, and/or electromagnetic radiation to provide some examples, within the electromagnetic spectrum within their fields of view which is emitted from the object 104 and/or a disturbance in the electromagnetic spectrum within their fields of view that is caused by the object 104. The detection module 106 can sweep the fields of view of the one or more sensors within the environment 100. This sweep can include a two dimensional sweep along a horizontal and a vertical directions within the environment 100, such a sweep along "x" and "y" axes of in a Cartesian coordinate system to provide an example, or can include a three dimensional sweep, such as a sweep along "x", "y", and "z" axes of the Cartesian coordinate system to provide an example. In an exemplary embodiment, the two dimensional sweep can be used to detect for the presence of the object 104 within the portion of the environment 100 whereas the three dimensional sweep can be used to focus in on the object 104 within the portion of the environment 100. As illustrated in FIG. 1, the fields of view of the one or more sensors are indicated by a tracking window 150.

The one or more sensors can include microbolometers, thermographic cameras terahertz cameras, infrared cameras, thermal sensors, acoustic sensors, infrared sensors, light cameras, infrared cameras, microbolometers, video image processors, magnetic sensors, magnetometers, infrared laser radar, ultrasonic sensors, microwave radar sensors, inductive-loop detectors, triboelectric sensors, seismic sensors, inertia-switch sensors, audio microphones, or any combination thereof. Although the tracking window 150 is illustrated as being a quadrilateral in FIG. 1, this is for illustrative purposes only. Those skilled the relevant art(s) will recognize that the configuration of the tracking window 150, as well as other tracking windows to be discussed below, depends on the implementation of the one or more sensors and can vary for different types of sensors without departing from the spirit and scope of the present disclosure.

Exemplary Scanning Operation of the Animal Collision Avoidance System

Figure 2:
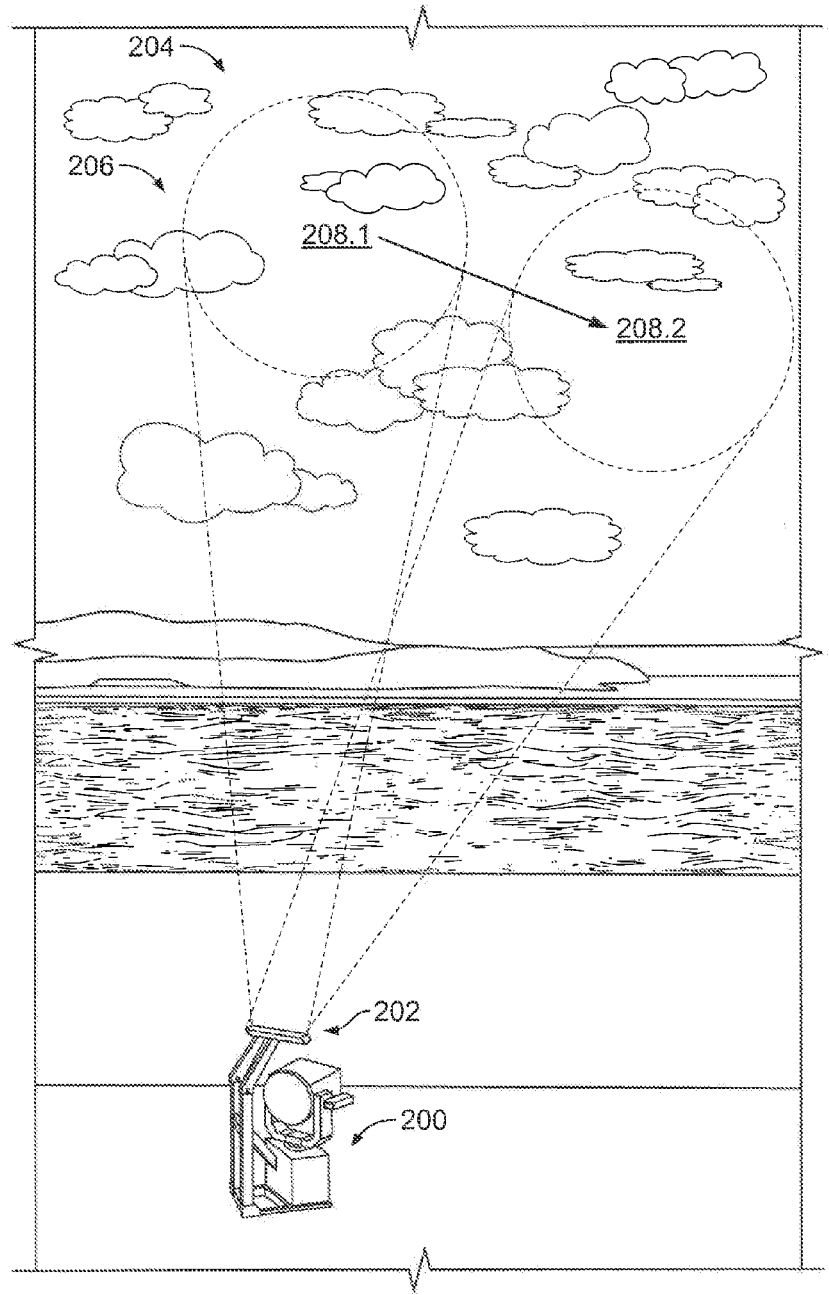
FIG. 2 illustrates a first exemplary operation of the detection module used in the animal collision avoidance system according to an exemplary embodiment of the present disclosure.

FIG. 2 illustrates a first exemplary operation of the detection module used in the animal collision avoidance system according to an exemplary embodiment of the present disclosure. An animal collision avoidance system 200 can include a detection module to provide an example, having one or more sensors 202 that sweep an environment 204 to scan for the presence of an object within their fields of view. The animal collision avoidance system 200 can represent an exemplary embodiment of the animal collision avoidance system 102.

The detection module can configure the one or more sensors 202 to scan a portion of the environment 204, referred to as a tracking window 206, within their fields of view to detect for the presence of the object. The one or more sensors 202 can be configured to sweep the tracking window 206 to detect for the presence of the object at a first tracking location 206.1 then be re-configured to sweep the tracking window 206 to detect for the presence of the object at a second location 206.2 when the object is not detected within the first tracking location 206.1. The detection module can continue to sweep the tracking window 202 to other tracking locations within the environment 204 until detecting the presence of the object.

Referring, back to FIG. 1, after detection of the object 104 within the environment 100, the detection module 106 begins to follow or track the object 104 within the tracking window 150 to allow for its recognition. Thereafter, the detection module 106 determines whether the object 104 within the tracking window 150 corresponds to one or more animals, one or more other objects other than animals, or any combination thereof. The detection module 106 determines one or more motion parameters of the object 104 and/or one or more characteristics of the object 104. The detection module 106 determines the motion parameters by attaching a frame of reference to the object 104 and measuring its change in position relative to another frame of reference. The motion parameters can be used to describe a change in position of the object 104 within the tracking window 150 with respect to time. This change in position can be described in terms of velocity, acceleration, displacement, time, weight, and/or mass. The characteristics of the object 104 within the tracking window 150 can relate to a physical appearance and/or a physical characteristic of the object 104. The characteristics can describe absolute characteristics of the object 104 such as a body mechanic and/or locomotion of the object 104. The body mechanic can include length, width, height, weight, temperature, and/or reflecting surface character to provide some examples. The locomotion can include running, swimming, jumping, flying or gaiting to provide some examples. Alternatively, or in addition to, the characteristics can describe relative characteristics of the object 104 such as a relative distance from a frame of reference to the object 104 to provide an example.

The detection module 106 compares the motion parameters and/or the characteristics of the object 104 to motion parameters and/or characteristics of multiple known objects, such as known animals or known other objects other than animals to provide some examples, to determine whether the motion parameters and/or characteristics of the object 104 are substantially similar to any of the motion parameters and/or characteristics of any of the multiple known objects. The detection module 106 recognizes the object 104 within the tracking window 150 as being one of the multiple known objects whose motion parameters and/or characteristics are substantially similar the motion parameters and/or characteristics of the object 104. The motion parameters and/or characteristics of the object 104 can be substantially similar to the motion parameters and/or characteristics of one of the multiple known objects when they are identical, namely match, or when they differ by a sufficiently small deviation. In an exemplary embodiment, the motion parameters and/or the characteristics can be used to recognize the object 104 as being an animal. In this exemplary embodiment, the motion parameters and/or the characteristics can be used to recognize the animal in terms of its biological class, such as Aves or Mammalia to provide some examples, and/or in terms of its biological order, such as Anseriformes, Galliformes, Charadriiformes, Gaviiformes, Podicipediformes, Procellariiformes, Sphenisciformes, Pelecaniformes, Phaethontiformes, Ciconiiformes, Cathartiformes, Phoenicopteriformes, Falconiformes, Gruiformes, Pteroclidiformes, Columbiformes, Psittaciformes, Cuculiformes, Opisthocomiformes, Strigiformes, Caprimulgiformes, Apodiformes, Coraciiformes, Piciformes, Trogoniformes, Coliiformes, Passeriformes or Chiroptera to provide some examples. However, those skilled in the relevant art(s) will recognize that the motion parameters and/or the characteristics can be used to recognize the animal in terms of other taxonomic ranks, such as life, domain, kingdom, phylum, family, genus, and/or species without departing from the spirit and scope of the present disclosure.

In another exemplary embodiment, the multiple known objects whose motion parameters and/or characteristics are being compared can be reduced or narrowed before the comparison. In this other exemplary embodiment, the detection module 106 can narrow down the multiple known objects for the comparison based upon environmental conditions, such as geographic location, time of day, time of year, or any other suitable environmental condition that can be present within the environment 100. For example, the detection module 106 can access a first database that includes information about the multiple known objects that are able to be found within the environment 100 and a second database that includes information about motion parameters and/or characteristics of the multiple known objects within the first database. In this example, the detection module 106 compares the object 104 to the first database to determine the multiple known objects that are able to be found within the environment 100 and compares the motion parameters and/or the characteristics of the object 104 to the motion parameters and/or the characteristics of these multiple known objects in the second database. The detection module 106 recognizes the object 104 within the tracking window 150 as being one of the multiple known objects from the second database whose motion parameters and/or characteristics are substantially similar to the motion parameters and/or the characteristics of the object 104. Additionally, the first database can be updated to include unknown objects that can be discovered within the environment 100 and the second database can be updated to include motion parameters and/or characteristics for these unknown objects within the environment 100.

Exemplary Recognition Operating of the Animal Collision Avoidance System

Figure 3:
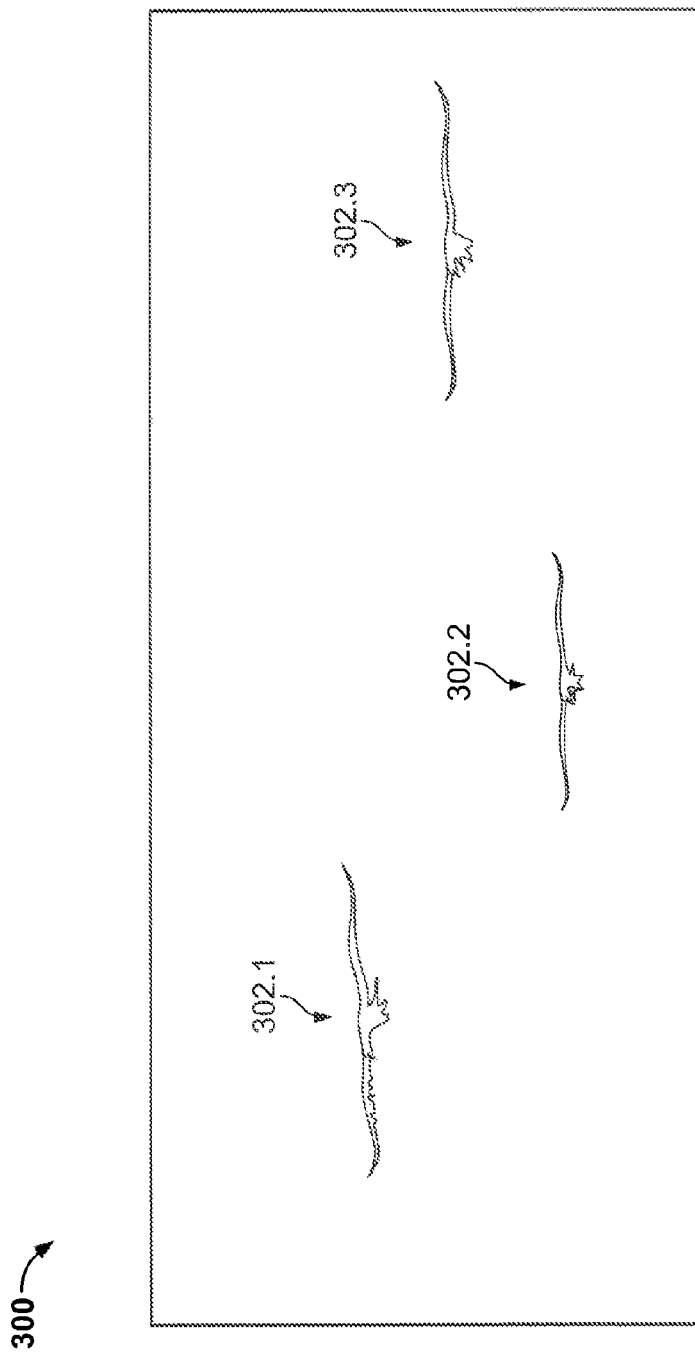
FIG. 3 illustrates a second exemplary operation of the detection module used in the animal collision avoidance system according to an exemplary embodiment of the present disclosure.

FIG. 3 illustrates a second exemplary operation of the detection module used in the animal collision avoidance system according to an exemplary embodiment of the present disclosure. A detection module sweeps an environment to scan for the presence of an object within its field of view. After detecting the object, the detection module compares motion parameters and/or characteristics of the object with various motion parameters and/or characteristics of animals in an attempt to recognize the object. The detection module can represent an exemplary embodiment of the detection module 106.

Specifically, the detection module sweeps the environment to scan for the presence of the object within its field of view to detect for the presence of objects 302.1 through 302.3. As illustrated in FIG. 3, the field of view of the detection module is indicated by a tracking window 300. After detecting the objects 302.1 through 302.3 within the environment, the detection module determines the motion parameters, such as velocity and/or acceleration to provide some examples, of the objects 302.1 through 302.3 and/or the characteristics, such as length, width, height, weight, and/or temperature, of the objects 302.1 through 302.3. Thereafter, the detection module compares the motion parameters and/or the characteristics of the objects 302.1 through 302.3 to motion parameters and/or characteristics of animals to determine whether the motion parameters and/or the characteristics of the objects 302.1 through 302.3 are substantially similar to any of the motion parameters and/or characteristics of the animals. As illustrated in FIG. 3, the detection module can determine that the objects 302.1 through 302.3 correspond to aquila chrysaetos or a golden eagle based upon a similarity between the motion parameters and/or the characteristics of the objects 302.1 through 302.3 and the motion parameters and/or the characteristics of the aquila chrysaetos.

Referring back to FIG. 1, the detection module 106 can optionally record an image of object 104 as it is being tracked or followed within the tracking window 150. Alternatively, or in addition to, the detection module 106 can record a series of images of the object 104 to form a video of the object 104 as it is being tracked or followed within the tracking window 150. Alternatively, or in addition to, the detection module 106 can record audio as the object 104 is being tracked or followed within the tracking window 150. The detection module 106 can provide the image, the video, and/or the audio, and optionally, the motion parameters and/or the characteristics of the object 104 to a remote Environmental Data Center for analysis.

Additionally, the detection module 106 can communicate a command and/or control signal 152 to control overall configuration and/or operation of the deterrence module 108. The command and/or control signal 152 can include tracking information which indicates a position of the object 104 within the environment and/or within the tracking window 150, and/or the motion parameters and/or the characteristics of the object 104, as well as an indication of the object 104, such as whether the object 104 is an animal, and optionally, a taxonomic rank, such the life, the domain, the kingdom, the phylum, the family, the genus, and/or the species, of the animal and communicate the taxonomic rank as part of the tracking information of the animal, or whether the object 104 is not an animal. The tracking information can be continuously, or near-continuously, updated by the detection module 106 as the object 104 is being tracked or followed or upon recognizing the object 104 as being an animal, and optionally, the taxonomic rank and/or as being another object other than the animal.

The deterrence module 108 provides one or more electronically generated deterrent signals 154 to deter the object 104 from entering into the environment 100 and/or to divert a trajectory of the object 104 away from the environment 100. The deterrence module 108 can configure the electronically generated deterrent signals 154 to track or to follow the object 104 in response to the tracking information. For example, the deterrence module 108 can receive the position of the object 104 and the motion parameters, such as velocity and acceleration, of the object 104 as part of the tracking information. In this example, the deterrence module 108 can compensate for the motion of the object 104 from its position within the environment and/or within the tracking window 150 when directing the one or more electronically generated deterrent signals 154 toward the object 104. The electronically generated deterrent signals 154 can include electronically generated signals or waves whose characteristics vary based upon whether the object 104 is an animal, and optionally, the taxonomic rank of the animal, and/or whether the object 104 is not an animal. These electronically generated signal or waves deter and/or divert the object 104 from the environment 100. The electronically generated signals or waves can include one or more electronically generated acoustic sounding signals to induce an acoustic startle reflex (ASR) of the object 104 and/or one or more lighting and/or sonic sounding signals to substantially enclose a zone within the environment 100 that deters and/or diverts the object 104 from the zone 100.

In an exemplary embodiment, the deterrence module 108 is configured to substantially minimize noise created by the one or more electronically generated deterrent signals 154 outside of the environment 100. Various Environmental Protection Agency (EPA) regulations and/or other local regulations regulate the amount of noise that is allowed within a given area. For example, the one or more electronically generated deterrent signals 154 cannot exceed allowable noise levels outside of the environment 100 which is usually at least approximately 1500 ft for a wind farm.

Figure 4:
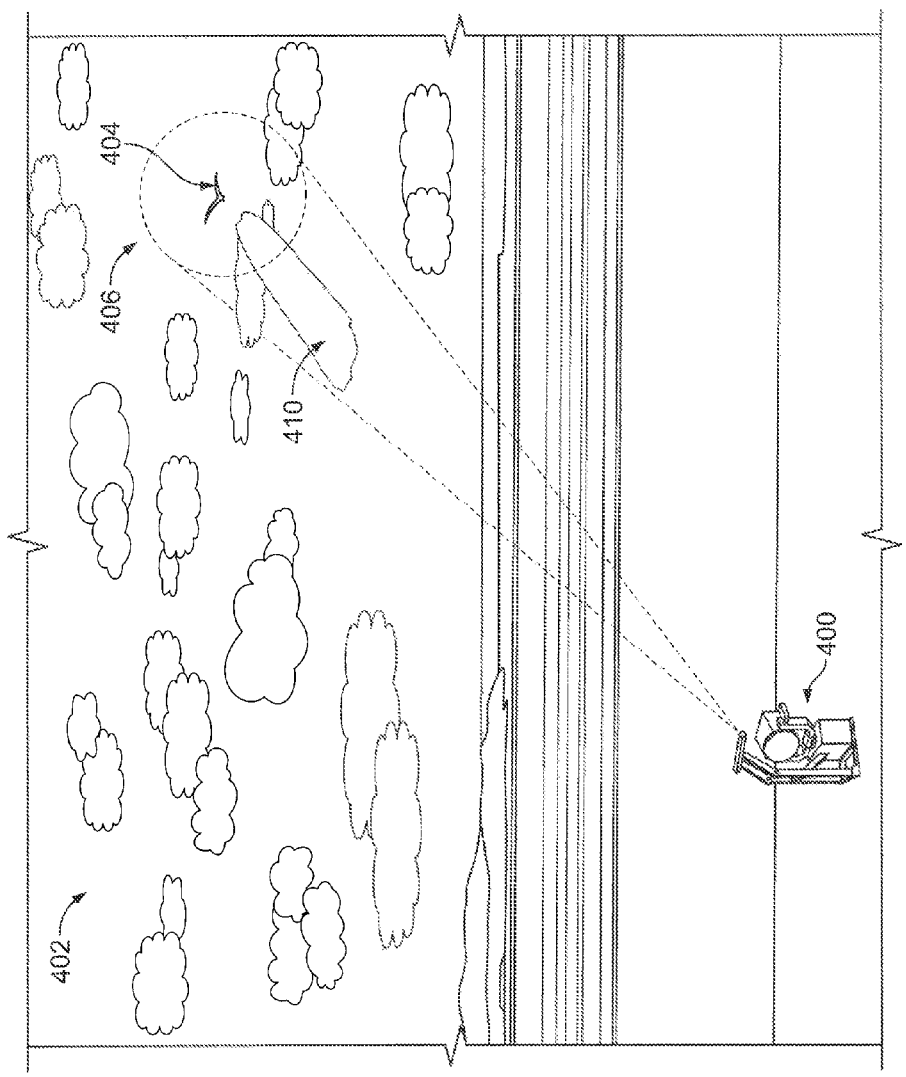
FIG. 4 illustrates an operation of a deterrence module used in the animal collision avoidance system according to an exemplary embodiment of the present disclosure.

Exemplary Deterring and/or Diverting Operation of the Animal Collision Avoidance System FIG. 4 illustrates an operation of a deterrence module used in the animal collision avoidance system according to an exemplary embodiment of the present disclosure. An animal collision avoidance system 400 provides one or more electronically generated deterrent signals to deter an object 404 from entering into an environment 402 and/or to divert a trajectory of the object 404 away from the environment 402. The animal collision avoidance system 400 can represent an exemplary embodiment of the animal collision avoidance system 102.

Specifically, a detection module within the animal collision avoidance system 400 sweeps the environment 402 to scan for the presence of the object, or can directly scan for the presence of the object without sweeping, 404 within a portion of the environment within its field of view. As illustrated in FIG. 4, the field of view of the detection module is indicated by a tracking window 406. After detecting the object 404 within the tracking window 406 and recognizing the object 404 as being an animal based upon motion parameters and/or characteristics of the object 404, the detection module communicates tracking information that corresponds to a position of the animal within the environment, such as "x", "y", and "z" coordinates of a Cartesian coordinate system to provide an example, and/or within the tracking window 406. The detection module can also recognize a taxonomic rank, such the life, the domain, the kingdom, the phylum, the family, the genus, and/or the species, of the animal and communicate the taxonomic rank as part of the tracking information. The detection module can further communicate the motion parameters and/or characteristics of the animal as part of the tracking information.

A deterrence module within the animal collision avoidance system 400 is configured to provide one or more electronically generated deterrent signals 410 to deter and/or divert the animal. The one or more electronically generated deterrent signals 410 represent deterrents that are specifically tailored to the taxonomic rank of the animal. For example as illustrated in FIG. 4, the electronically generated deterrent signals 410 can represent electronically generated signals or waves can that include electronically generated acoustic sounding signals that are specifically tailored to deter and/or to divert the animal in the taxonomic family of laridae, such as a gull to provide an example. The deterrence module can configure and/or direct the electronically generated deterrent signals 410 toward the animal in accordance with the tracking information. Additionally, the deterrence module can compensate for the motion of the animal from its position within the environment and/or within the tracking window 406 when directing the electronically generated deterrent signals 410 toward the animal. The detection module can update the tracking information to allow the deterrence module to track or follow the animal as it approaches and/or traverses through the environment 402.

Exemplary Electronically Generated Deterrent Signals that can be Implemented within the Animal Collision Avoidance System Various exemplary electronically generated deterrent signals can be used within an animal collision avoidance system are to be discussed as deterring birds and/or bats from entering into an environment and/or to divert trajectories of the birds and/or bats away from the environment. However, these exemplary electronically generated deterrent signals are not limited to the deterring and/or the diverting of the birds and/or the bats; those skilled in the relevant art(s) will recognize that these exemplary deterrents can be modified to deter and/or to divert other animals without departing from the spirit and scope of the present disclosure.

Acoustic Startle Reflex (ASR) to Deter and/or to Divert Birds

The electronically generated deterrent signals can include an electronically generated acoustic sounding signal to induce an acoustic startle reflex (ASR) of an animal. The ASR of the present disclosure sustains animal deterrence and divergence over prolonged periods of time, substantially avoiding habituation and substantially simultaneously avoiding harassment, using an electronically generated acoustic sounding signal. The electronically generated acoustic sounding signal can initiate the ASR of the animal by providing one or more frequency transmissions through a cochlear nerve of the animal.

The electronically generated acoustic sounding signal, within the hearing frequency range of the animal with fast frequency variations and sharp sound intensity increases, can cause initiation of the ASR of the animal. In an exemplary embodiment, for a bird, the electronically generated acoustic sounding signal is between approximately 300 Hz and approximately 6500 Hz and increase from approximately ambient noise level to levels above approximately 112 dB for less than approximately 30 ms rise time measured at approximately 3.3 foot from an ear of the bird. Typically, the electronically generated acoustic sounding signal creates significant signal transmission in the cochlear nerve and directly activates a motor center in a reticular formation of a brain of the animal.

Figure 5:
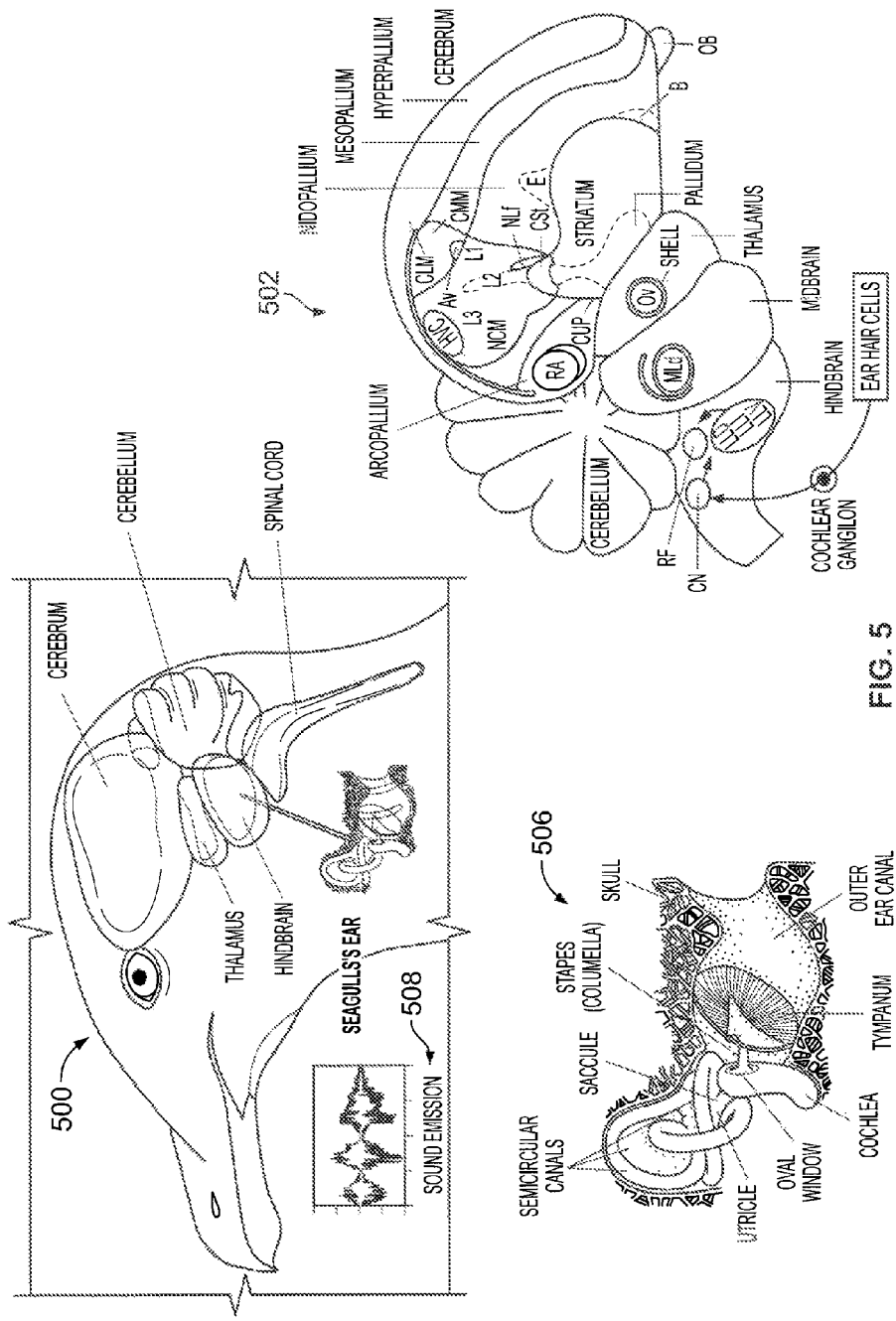
FIG. 5 illustrates an operation of the electronically generated acoustic sounding signal upon a bird according to an exemplary embodiment of the present disclosure.

FIG. 5 illustrates an operation of the electronically generated acoustic sounding signal upon a bird according to an exemplary embodiment of the present disclosure. A simplified biological structure of a taxonomic class Aves, such as a gull 500. The simplified biological structure of the gull 500 includes a brain 502 having a cerebrum, a cerebellum, a thalamus, and a hindbrain, which is connected to a spinal cord 504. The simplified biological structure of the gull 500 also includes an ear 506 having semricircuiar canals, stapes, a portion of a skull, a saccule, an utricle, an oval window, a cochlea, a tympanumn, and an outer car canal that are connected to the brain 502 via an cochlear nerve. An electronically generated acoustic sounding signal 508 is configured to warn the brain 502 by passing through the auditory pathway, namely, from the outer ear canal, through the tympanum, the stapes the oval window, the cochlea, the utricle, the saccule, the semicircular canals to the cochlear nerve, of the ear 506 up to the nucleus of the lateral lemniscus, located in the hindbrain, of the brain 502. The electronically generated acoustic sounding signal 508 then activates a motor center in the reticular formation of the brain 502. This leads to a substantially immediate reaction, referred to as the ASR, in the gull 500 without affecting, or substantially affecting, its health and without elevating, or substantially elevating. its stress hormone release.

Figure 6:
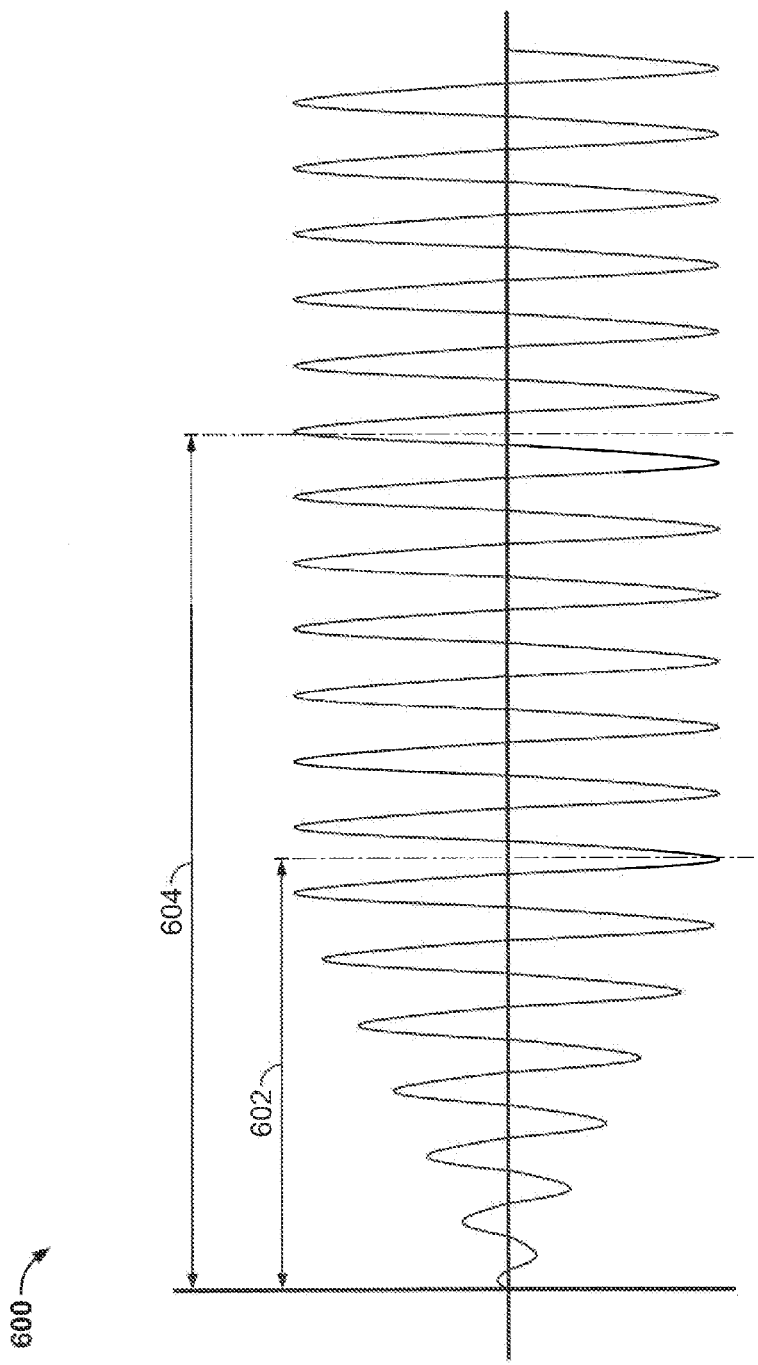
FIG. 6 illustrates an exemplary electronically generated acoustic sounding signal having an exemplary synthetic sounding signal according to an embodiment of the present disclosure.

An Exemplary Electronically Generated Acoustic Sounding Signal Having an Exemplary Synthetic Sounding Signal to Induce the Asr of Birds FIG. 6 illustrates an exemplary electronically generated acoustic sounding signal having an exemplary synthetic sounding signal according to an embodiment of the present disclosure. An electronically generated acoustic sounding signal 600 induces the ASR of a bird to deter the bird from an environment or to divert a trajectory of the bird away from the environment. The electronically generated acoustic sounding signal 600 sustains deterrence and/or divergence of the bird over prolonged periods of time, avoiding habituation. The electronically generated acoustic sounding signal 600 can initiate the ASR of the bird by creating significant signal transmission in its cochlear nerve and directly activating a motor center in a reticular formation of a brain of the bird as discussed in FIG. 5. The electronically generated acoustic sounding signal 600 can represent an exemplary embodiment of the electronically generated deterrent signals 154, the electronically generated deterrent signals 410, and/or the electronically generated acoustic sounding signal 508.

The electronically generated acoustic sounding signal 600 can include a synthetic sounding signal. The synthetic sounding signal has a stronger effect upon the bird when the risetime from the first power level to the second power level is the shortest. The synthetic sounding signal varies between a first power level to a second power level. The synthetic sounding signal should rise from the first power level to the second power level before expiration of a maximum ASR rise time 604. If the synthetic sounding signal should rises from the first power level to the second power level after the expiration of the maximum ASR rise time 604 the synthetic sounding signal may not induce the ASR of the bird. When the synthetic sounding signal reaches the second power level before the maximum ASR rise time 604, a signal pathway for the synthetic sounding signal substantially stays within a brainstem of the bird, making it impossible, or near impossible, for the bird to make a comprehensive assessment of the sound in the auditory cortex. Without such assessment, the bird is not able to determine what the synthetic sounding signal is, but instead the bird initiates reflex reaction, such as an eye blink and/or a momentary muscle jerk to provide some examples. Due to the lack of analyzing capabilities during the ASR, the bird is not able to substantially habituate to the synthetic sounding signal; it becomes more sensitive with every exposure. Also, since during the ASR, processing of the synthetic sounding signal is contained within the hindbrain, the synthetic sounding signal does not active a hypothalamus of the bird causing the bird not to release corticosterone in its system, thus not substantially elevating a stress level of the bird. The synthetic sounding signal induces the ASR of the bird to cause the bird to deter and/or to divert from its trajectory, typically in a substantially opposite direction of the synthetic sounding signal without any substantially elevated stress level or any substantially negative effect on its health and wellbeing. The bird does not substantially habituate to the synthetic sounding signal, or even multiple exposures of the synthetic sounding signal.

FIG. 17 illustrates an effect of multiple exposures of the exemplary electronically generated acoustic sounding signal having the exemplary synthetic sounding signal according to an embodiment of the present disclosure. As illustrated in FIG. 17, the second power level of the synthetic sounding signal to induce the ASR of the birds reduces, on average, as the birds are repeatedly exposed to the synthetic sounding signal over multiple days. For example, the second power level of the synthetic sounding signal need to be at least 118 dB to induce the ASR of the birds on day 1 which was reduced to at least 100 dB on day 5 to induce the ASR of the birds. This reduction in the second power level indicates that the birds are becoming more sensitive to the synthetic sounding signal with repetition which is the opposite of habituation.

Referring back to FIG. 6, otherwise, when the synthetic sounding signal reaches the second power level after the maximum ASR rise time 604, the signal pathway for the synthetic sounding signal changes and the synthetic sounding signal is processed by an auditory cortex of the bird not causing a reflex reaction in the bird. This lack of reflex reaction does not induce the ASR of the bird, allowing the bird to analyze the synthetic sounding signal and eventually habituate to the synthetic sounding signal. Typically, when the synthetic sounding signal rise time reaches the second power level after the maximum ASR rise time 604, the synthetic sounding signal is processed, not in the hindbrain only, but in the auditory cortex. This processing allows the bird to analyze the synthetic sounding signal, to assess the synthetic sounding signal, and if the synthetic sounding signal does not pose a real danger to the bird, to acknowledge the synthetic sounding signal as a not being the real danger, thereby allowing the bird to ignore the repeated use of the synthetic sound. This ignoring by the bird eventually leads to habituation of the bird to repeated use of the synthetic sounding signal that has not induced ASR.

In an exemplary embodiment, the synthetic sounding signal is configured such that the second power level reaches an operational ASR rise time 602 which is before the maximum ASR rise time 604 to induce the ASR of the bird. For example, the synthetic sounding signal can be characterized as being a very fast accelerating electronically generated sound that rises from the first power level to the second power level of approximately 112 dB or higher at an approximately 3.3 foot distance from a tympanum of the bird in approximately 5 ms. In this example, if the synthetic sounding signal were to reach the second power level of 112 dB in less than approximately 10 ms, a signal pathway for the synthetic sounding signal substantially stays within the brainstem of the bird inducing the ASR of the bird. In this example, if the synthetic sounding signal were to reach the second power level of 112 dB in more than approximately 30 ms, the synthetic sounding signal is processed by the auditory cortex of the bird causing the reflex reaction in the bird, thereby not inducing ASR.

Additionally, the synthetic sounding signal can include multiple frequencies, such as white noise to provide an example, and/or a single frequency. In another exemplary embodiment, the synthetic sounding signal should be less than approximately 6500 Hz, and to be most effective, it should be lower than approximately 1500 Hz. Typically, after reaching the second power level, the synthetic sounding signal remains at the second power level for a predetermined amount of time. For example, the synthetic sounding signal remains at the second power level for a duration of approximately 80 ms; however, other durations are possible that will be apparent to those skilled in the relevant art(s) without departing from the spirit and scope of the present disclosure.

Further, characteristics of the synthetic sounding signal can vary based upon the taxonomic rank the bird. Various exemplary synthetic sounding signals for various species of birds are illustrated in the table below.

| | Bird species | Sound pressure dB/SPL (C) at 3.3 feet from the tested species required for the initiation of ASR | | | |
|---|---|---|---|---|---|
| | | 300 Hz | 600 Hz | 1200 Hz | 2400 Hz |
| 1 | *Anas platyrhynchos* Wild Duck | 113 | 113 | 115 | 120 |
| 2 | *Meleagris gallopavo* Wild Turkey | no ASR | 117 | 120 | no ASR |
| 3 | *Anser anser* (male) Greylag Goose | 105 | 110 | 102 | 115 |
| 4 | *Anser anser* (female) Greylag Goose | 119 | 113 | 115 | no ASR |
| 5 | *Numida meleagris* Helmeted Guineafowl | 117 | 113 | no ASR | no ASR |
| 6 | *Gallus gallus* Red Junglefowl | 116 | 113 | 117 | no ASR |
| 7 | *Agapornis roseicollis* Rosy-faced Lovebird | 103 | 103 | 97 | 108 |
| 8 | *Psittacula cyanocephala* Plum-headed Parakeet | no ASR | 112 | 113 | no ASR |
| 9 | *Platycercus eximius* Eastern Rosella | 112 | 109 | 114 | no ASR |
| 10 | *Cyanoramphus novaezelandiae* Red-crowned Parakeet | 103 | 107 | 117 | no ASR |
| 11 | *Fringilla coelebs* Chaffinch | 106 | 111 | 107 | 118 |
| 12 | *Nymphicus hollandicus* Cockatiel | 103 | 104 | 106 | 106 |
| 13 | *Melopsittacus undulates* Budgerigar | 104 | 103 | 104 | 105 |
| 14 | *Goura cristata* Western Crowned Pigeon | 113 | 112 | 114 | no ASR |

The table above shows for each of the various species of birds, the frequency and sound intensity where the ASR is observed. It is important to recognize that the above sound pressures are to be achieved at approximately 3.3 foot from ears of the various species of birds. In order to achieve this sound intensity at least approximately 110 yards away from a wind turbine, which is the minimum distance the various species of birds need for reaction, the synthetic sounding signal at the source needs to be considerably higher compensating for the distance, the wind speed, and the other weather conditions. This requires also the sound emitters to be able to focus the synthetic sounding signal as to minimize the loss of sound pressure and/or to limit the noise outside the targeted area.

The synthetic sounding signal is often sufficient to induce the ASR in the bird to deter and/or to divert the bird from the environment. However, in some situations, if the synthetic sounding signal needs to further amply its direct effect on the bird, increasing the magnitude of the ASR increases the deterrence and/or divergence of the bird from the environment. In these situations, the synthetic sounding signal can be sequentially repeated with silence intervals between each synthetic sounding signal to deter and/or to divert the bird from the environment. In an exemplary embodiment, the silence intervals are approximately 100 ms in duration. The synthetic sounding signal can vary in frequency and/or power level between repetitions.

Figure 7:
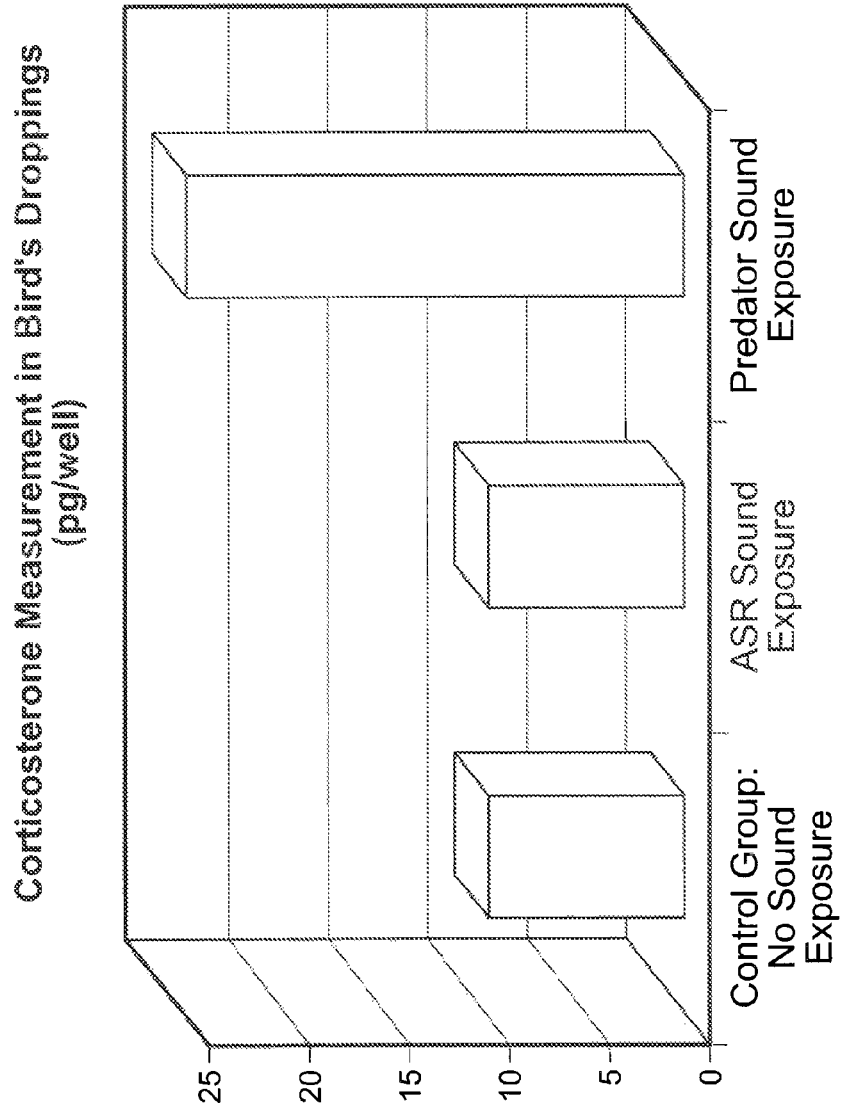
FIG. 7 illustrates an affect of the exemplary synthetic sounding signal on a bird according to an embodiment of the present disclosure.

Exposure of the Bird to the Exemplary Synthetic Sounding Signal Neither Stresses Nor Harasses the Bird FIG. 7 illustrates an affect of the exemplary synthetic sounding signal on a bird according to an embodiment of the present disclosure. Initiating the ASR in birds, such as the gull 500 to provide an example, using a synthetic sounding signal of an electronically generated acoustic sounding signal, such as the electronically generated acoustic sounding signal 600 to provide an example, to activate a primary acoustic startle circuit in the bird does not significantly elevate a level of glucocorticoid metabolites, such as corticosterone, in waste of the bird. Corticosterone is a 21-carbon steroid hormone of the corticosteroid type produced in a cortex of adrenal glands of the bird. Typically, more corticosterone is present in waste of the bird when it is stressed or harassed. As illustrated in FIG. 7, when exposed to the multiple repetitions of the synthetic sounding signal, the corticosterone present in the waste of the bird is substantially similar to the corticosterone present in the waste of the bird when not exposed to the synthetic sounding signal. This indicates that the ASR initiation itself does not activate the hypothalamic-pituitary-adrenal axis as the electronically generated acoustic sounding signal is primary processed in the hindbrain, without activation of the hypothalamus. Activation of the ASR of the bird can be used as a method of influencing its behavior, as it does not affect, or substantially affect, stress level and/or wellbeing of the bird. However, when the bird is exposed to natural threats, as indicated from distress calls, predator calls, and/or alarming calls to provide some examples, the corticosterone present in the waste of the bird is greater than the corticosterone present in the waste of the bird when exposed to the electronically generated acoustic sounding signal.

Exemplary Electronically Generated Acoustic Sounding Signal Having Synthetic Sounding Signals and Modulation Sounds to Deter and/or to Divert Birds Often times, one or more intervals of the synthetic sounding signal of the electronically generated acoustic sounding signal induces the ASR of the bird to divert and/or to deter the bird from the environment. However, only in extreme rare cases, the bird does not react to three or more repetitions of the synthetic sounding signal of the electronically generated acoustic sounding signal. In these situations, the synthetic sounding signal of the can be sequenced with other synthetic modulation sounds to form other electronically generated acoustic sounding signals to divert and/or to deter the bird from the environment. Modulation sounds include synthetic sounds that draw the attention of the bird towards the source of the sound resulting in modulation by attention, or it includes synthetic sounds that mimic biological sounds which evoke emotions in the birds resulting in modulation by emotion. The synthetic sounding signal that induces ASR can be sequenced with modulation sounds to form other electronically generated acoustic sounding sequences.

Figure 8:
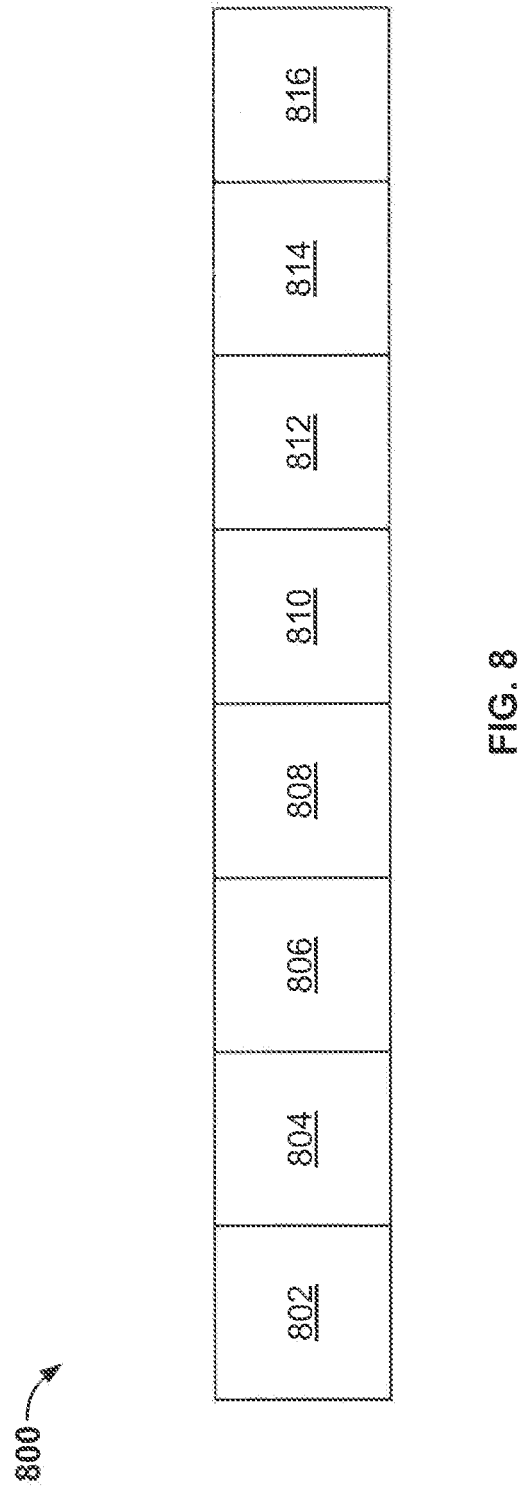
FIG. 8 illustrates an exemplary electronically generated acoustic sounding signal having the exemplary synthetic sounding signal and an exemplary modulation sound according to an embodiment of the present disclosure.

FIG. 8 illustrates an exemplary electronically generated acoustic sounding signal having the exemplary synthetic sounding signal that induces ASR and an exemplary modulation sound according to an embodiment of the present disclosure. An electronically generated acoustic sounding sequence 800 includes various synthetic sounding signals, various modulation sounds, and combinations of the synthetic sounding signals and the modulation sounds. The biological sounds as one group of the modulation sounds, can evoke threat responses that are recognized as a natural danger to the bird. These biological sounds, that are perceived to come from the close distance source, amplify the warning in a brain of the bird. This amplification makes the bird even more sensitive to startling sound stimuli, and, in an exemplary embodiment, the biological sounds allow for decrease of the sound intensity which can end in substantial silence for approximately 500 ms prior to the next sharp sound intensity rise, thus avoiding pre-pulse inhibition (PPI) of the ASR. The sequencing between these electronically generated sounds that induce ASR and biological sounds creates modulation of the ASR by evoking emotion which amplifies further the intensity of the ASR and the bird's willingness to escape the sound stimuli without fast habituation.

A first electronically generated modulation sound, also referred to as modulation-by-attention signal, represents an electronically produced synthetic sound that focuses the attentional process of the animal. In an exemplary embodiment, the first sounding signal is characterized as varying from approximately 300 Hz to approximately 6500 Hz in cyclical repetition for a duration of approximately 3 seconds to approximately 5 seconds; however, other frequencies and/or durations are possible that will be apparent to those skilled in the relevant art(s) without departing from the spirit and scope of the present disclosure.

A second electronically generated sound can be characterized as being a substantial silence interval. Typically, the silence interval lasts for a duration of approximately 500 ms; however, other durations are possible that will be apparent to those skilled in the relevant art(s) without departing from the spirit and scope of the present disclosure. The silence interval should cease while the attention processes in the brain of the bird from a previous synthetic sounding signal and/or a previous modulation sound persists. The second electronically generated sound can be characterized as eliminating a sensorimotor gating process in the bird. The sensorimotor gating processes reduce the effective intensity of the startle eliciting stimulus. The second electronically generated sound typically reduces pre-pulse inhibition (PPI) of the bird, thereby allowing the previous synthetic sounding signal and/or the previous modulation sound to be more effective.

A third electronically generated modulation sound can be characterized as being a natural sound of threat. The natural sounds of threat represent various sounds that cause modulatory circuit reaction in birds created by natural danger indicators which are recognized by the birds. These natural sounds of threat can include distress calls, predator calls, alarming, such as warning calls of its own species or other species, or any other suitable sound that are found in all habitats that will be apparent to those skilled in the relevant art(s) without departing from the spirit and scope of the present disclosure. In most natural habitats, there are certain birds whose calls are used by all birds in the habitat as a warning signal. The effectiveness priority of the type of threats is the following: 1) distress call of the warned species, 2) predator call of a predator specific to the warned species, 3) distress calls of a bird species that is generally recognized by the other species as warning indictor, 4) distress call of other species in the habitat. In an exemplary embodiment, the natural sound of threat is very habitat specific, and for each habitat the natural sound of threat should be altered to represent sounds that only exist in that habitat. Then, to be the most effective, the natural sound of threat should be ethologically as close to the bird as possible.

In an exemplary embodiment, an acoustic logarithmic distance compensator (ALDC) can be used to increase loudness of higher frequencies within the natural sound of threat relative to lower frequencies in a progressive manner since higher frequencies are absorbed more in the atmosphere. For example, arriving sound from approximately 165 yards should have similar frequency characteristics as the same sound approximately 3.3 feet away. This causes the natural sound of threat sound seem closer to the birds, than they expect, which further increases emotional modulation of the natural sounds of threat.

As shown in FIG. 8, the synthetic sounding signal as discussed in FIG. 6 and FIG. 7 can be sequenced with the first, the second, and/or the third electronically generated modulation sounds to form the electronically generated acoustic sounding sequence 800. For example, the electronically generated acoustic sounding sequence 800 can be characterized as having intervals 802 through 816. In this example, the synthetic sounding signal as discussed in FIG. 6 and FIG. 7 can be used during a first interval 802, a fourth interval 808, and a seventh interval 814, the first electronically generated modulation sound can be used during a second interval 804, the second electronically generated modulation sound can be used during a third interval 806 and a sixth interval 812, and the third electronically generated modulation sound can be used during a fifth 810 and an eighth interval 816. However, this example is not limiting, those skilled in the relevant art(s) will recognize that other combinations of the synthetic sounding signal as discussed in FIG. 6 and FIG. 7 and the first, the second, and/or the third electronically generated modulation sounds can be sequenced to form the electronically generated acoustic sounding signal 800 without departing from the spirit and scope of the present disclosure. For example, longer durations for the electronically generated acoustic sounding signal 800 can be used in environments, such as an airport to provide an example, where environmental noise is of little concern. Whereas, shorter durations for the electronically generated acoustic sounding signal 800 can be used in environments, such as urban areas to provide an example, where environmental noise is more of a concern.

Exemplary Electronically Generated Lighting Signals to Deter and/or to Divert Birds Alternatively, or in addition to, the electronically generated deterrent signals can include electronically generated lighting signals to substantially enclose a zone within an environment to deter an object from entering into the zone and/or to divert a trajectory of the object away from the zone.

Figure 9:
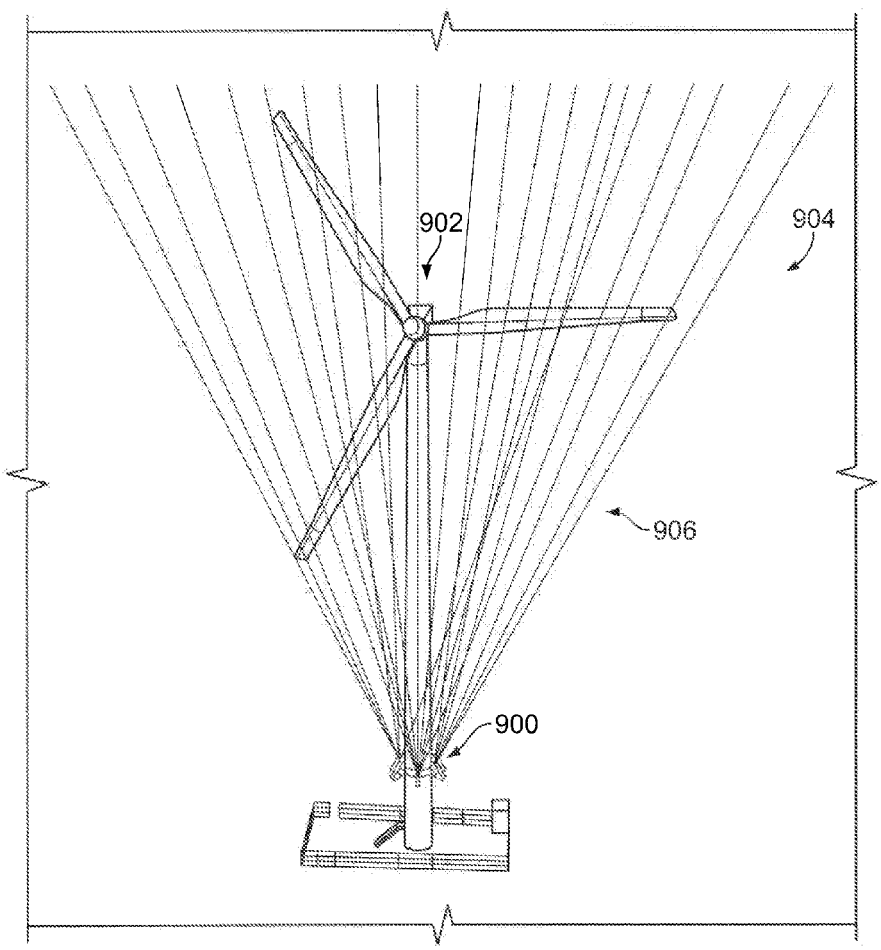
FIG. 9 illustrates an exemplary electronically generated lighting signal according to an embodiment of the present disclosure.

FIG. 9 illustrates an exemplary electronically generated lighting signal according to an embodiment of the present disclosure. An animal collision avoidance system 900 provides an electronically generated lighting signal 906 to substantially enclose a zone within an environment to deter an object from entering into the zone and/or to divert a trajectory of the object away from the zone. The object can include one or more animals, such as one or more birds to provide an example, one or more other objects other than animals, or any combination thereof. The animal collision avoidance system 900 can provide the electronically generated lighting signal 906 in conjunction with other electronically generated detereant signals to deter and/or divert the object. The animal collision avoidance system 900 can represent an exemplary embodiment of the animal collision avoidance system 102.

As illustrated in FIG. 9, the animal collision avoidance system 900 provides the electronically generated lighting signal 906 to substantially enclose the portion of a wind farm 904 having a wind turbine 902. The electronically generated lighting signal 906 encloses the wind turbine 902 to deter a bird from entering into a zone proximate to the wind turbine 902 and/or to divert a trajectory of the bird away from the zone proximate to the wind turbine 902. This deterring and diverting of the bird can prevent the bird from contacting the wind turbine 902.

The animal collision avoidance system 900 includes one or more laser modules having a sufficient number of lasers to substantially enclose the wind turbine 902 within the electronically generated lighting signal 906. In an exemplary embodiment, the animal collision avoidance system 900 includes multiple green laser modules that collectively produce approximately 300 laser beams, each under approximately 5 mW in power, to substantially enclose the wind turbine 902. Although green lasers are preferred, those skilled in the relevant art(s) will recognize that other colors or combinations of colors for the laser modules can be used without departing from the spirit and scope of the present disclosure. The animal collision avoidance system 900 can cause the one or more laser modules to substantially simultaneously activate their respective laser beams or can duty cycle the one or more laser modules such that a first group of lasers from among the one or more laser modules simultaneously activate their respective laser beams while a second group of lasers from among the one or more laser modules are inactive. This duty cycling of the lasers can be used effectively cause the electronically generated lighting signal 906 to appear to be in motion, such as flashing on and off to provide an example, to more clearly present the electronically generated lighting signal 906 to the object under certain environmental conditions.

In an exemplary embodiment, the animal collision avoidance system 900 provides the electronically generated lighting signal 906 during low light environmental conditions, such as between approximately dusk and approximately dawn to provide an example, to deter and/or to divert the object in these low light environmental conditions. However, those skilled in the relevant art(s) will recognize that the animal collision avoidance system 900 can provide the electronically generated lighting signal 906 in other low light environmental conditions as well as high light environmental conditions, such as between approximately dawn and approximately dusk to provide an example, without departing from the spirit and scope of the present disclosure.

Exemplary Electronically Generated Sonic Signals to Deter and/or to Divert Bats

Bat safety deflection employs very different technology from the ASR based approach as discussed above. In a wind farm, several studies show that the primary cause of death of bats is not due to the collision with blades of wind turbines within the wind farm, but rather due to significant pressure changes that occur from movement of the blades. Thus, the bats are surprised by the large pressure change associated with the movement of the blades that ruptures their sensitive lungs. To prevent this from happening and without stressing the bats, the electronically generated deterrent signals can include electronically generated sonic signals to prevent the bats from being exposed to the significant pressure changes that occur from movement of the blades.

Figure 10A:
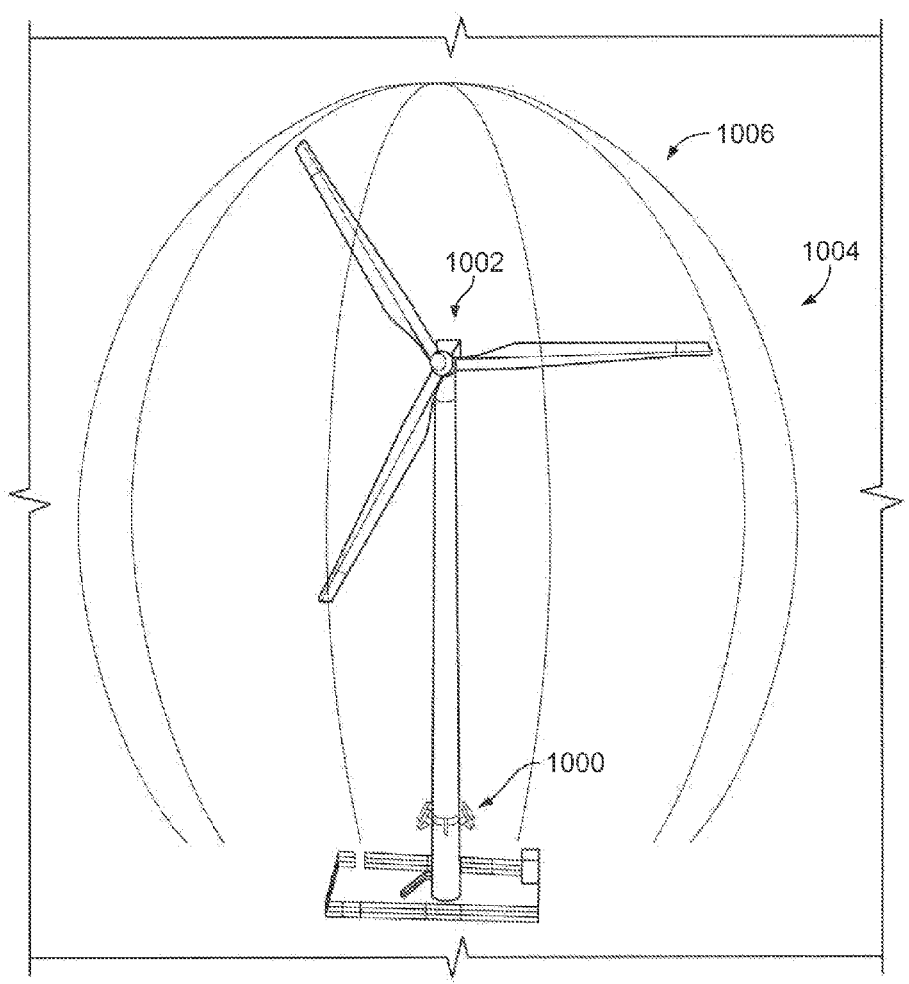
FIG. 10A illustrates an exemplary electronically generated sonic signal according to an embodiment of the present disclosure.

FIG. 10A illustrates an exemplary electronically generated sonic signal according to an embodiment of the present disclosure. An animal collision avoidance system 1020 provides an electronically generated sonic signal 1006 to substantially enclose a zone within an environment to deter an object from entering into the zone and/or to divert a trajectory of the object away from the zone. The object can include one or more animals, such as one or more bats to provide an example, one or more other objects other than animals, or any combination thereof. The animal collision avoidance system 1020 can provide the electronically generated sonic signal 1006 in conjunction with other electronically generated detereant signals to deter and/or divert the object. The animal collision avoidance system 1020 can represent an exemplary embodiment of the animal collision avoidance system 102.

As illustrated in FIG. 10, the animal collision avoidance system 1020 provides the electronically generated sonic signal 1006 to substantially enclose a wind turbine 1002. The electronically generated sonic signal 1006 substantially encloses the wind turbine 1002 to deter a bat from entering into a zone proximate to the wind turbine 1002 and/or to divert a trajectory of the bat away from the zone proximate to the wind turbine 1002. This deterring and diverting of the bat can prevent the bat from being exposed to the significant pressure changes that occur from movement of blades of the wind turbine 1002.

Typically, the bat is very sensitive to sounds within a first frequency range of approximately 4 kHz to approximately 7 kHz and second frequency range of approximately 22 kHz to approximately 24 kHz. The bat is capable of hearing sounds within the first frequency range that correspond frequency ranges of sounds of its flying insect prey. When the sounds of the flying insect prey are present, the bat is not relying on echolocation to locate the flying insect prey, but on its hearing abilities to locate the flying insect prey. The animal collision avoidance system 1020 can provide the electronically generated sonic signal 1006, typically above 60 dB in power, in the first frequency range thereby reducing the ability for the bat to use its hearing abilities to locate its prey. This causes the bat to be unable to hunt for its flying insect prey which causes the bat to avoid the zone proximate to the wind turbine 1002. Therefore, when the electronically generated sonic signal 1006 is maintained within a sufficient radius outward from the wind turbine 1002, the bat will soon learn that within this safety zone it cannot hunt for its flying insect prey, as its hearing abilities are partly disabled. In an exemplary embodiment, the first frequency range has sufficient atmospheric propagation characteristics to allow the electronically generated sonic signal 1006 to propagate distances greater than 100 meters to maintain the sufficient radius outward from the wind turbine 1002.

Figure 10B:
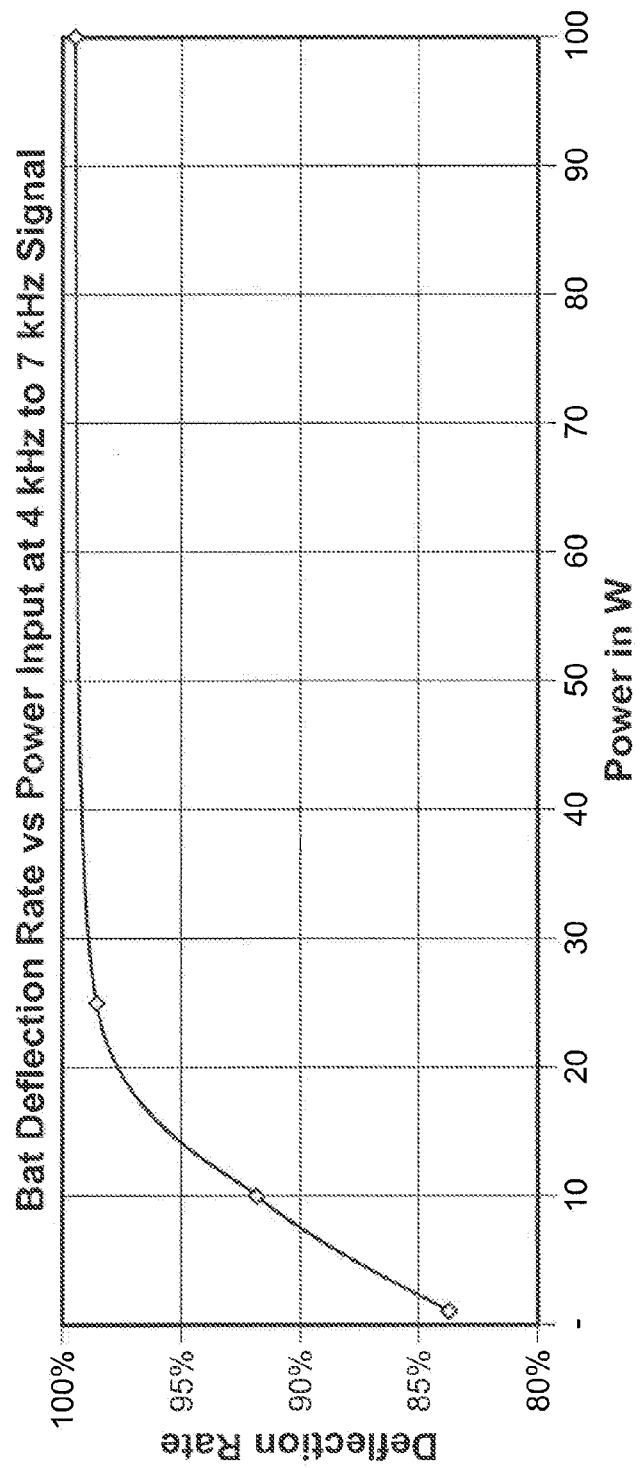
FIG. 10B illustrates an exemplary effectiveness of the electronically generated sonic signal in deterring and/or diverting bats when operating in a first frequency range according to an embodiment of the present disclosure.

FIG. 10B illustrates an exemplary effectiveness of the electronically generated sonic signal in deterring and/or diverting bats when operating in a first frequency range according to an embodiment of the present disclosure. As illustrated in FIG. 10B, a deflection rate of bats is approximately 92% when the electronically generated sonic signal 1006 has a power level of approximately 10 W. Increasing the power level of the electronically generated sonic signal 1006 to be approximately 30 W results in a deflection rate of approximately 99%.

Referring back to FIG. 10A, the second frequency range can be used to create a safety zone in which the bat cannot echolocate. The electronically generated sonic signal 1006 disables an ability of the bat to detect echoes reflected from its environment. This safety zone is analogous to a thick fog for the human eyes. It is important to emphasize that the electronically generated sonic signal 1006 does not completely disable the echolocation of the bat, as the bat can still fly into this zone without confusion. Only their hunting abilities are affected in this safety zone.

The animal collision avoidance system 1020 can provide the electronically generated sonic signal 1006 in any combination of the first frequency range and the second frequency range to produce a more effective safety zone to deter and/or divert the bat from being exposed to the significant pressure changes that occur from movement of the blades. Since the bat has a high metabolism, it cannot afford to fly in areas where effectiveness of its hearing and/or echolocation is reduced, and the bat soon learns that it cannot fly in this safety zone generated by the electronically generated sonic signal 1006. Once the bat leaves this safety zone, its hearing and/or its echolocation are completely enabled. This creates a long-term solution that will minimize or eliminate bat casualties from the wind farm 1004.

Exemplary Environments for Installation of the Animal Collision Avoidance System Various exemplary environments where an animal collision avoidance system can be located are to be discussed below. However, these exemplary environments are not limiting, those skilled in the relevant art(s) will recognize that the animal collision avoidance system can be used within other environments such as an oil sand site, an oil rig, a ship, farmland, an open pit mining site, a military base, an area of industrial hazard, a food storage facility, a chemical facility a golf course, a hospital, a building, and/or a parking lot to provide some examples, without departing from the spirit and scope of the present disclosure.

Figure 11:
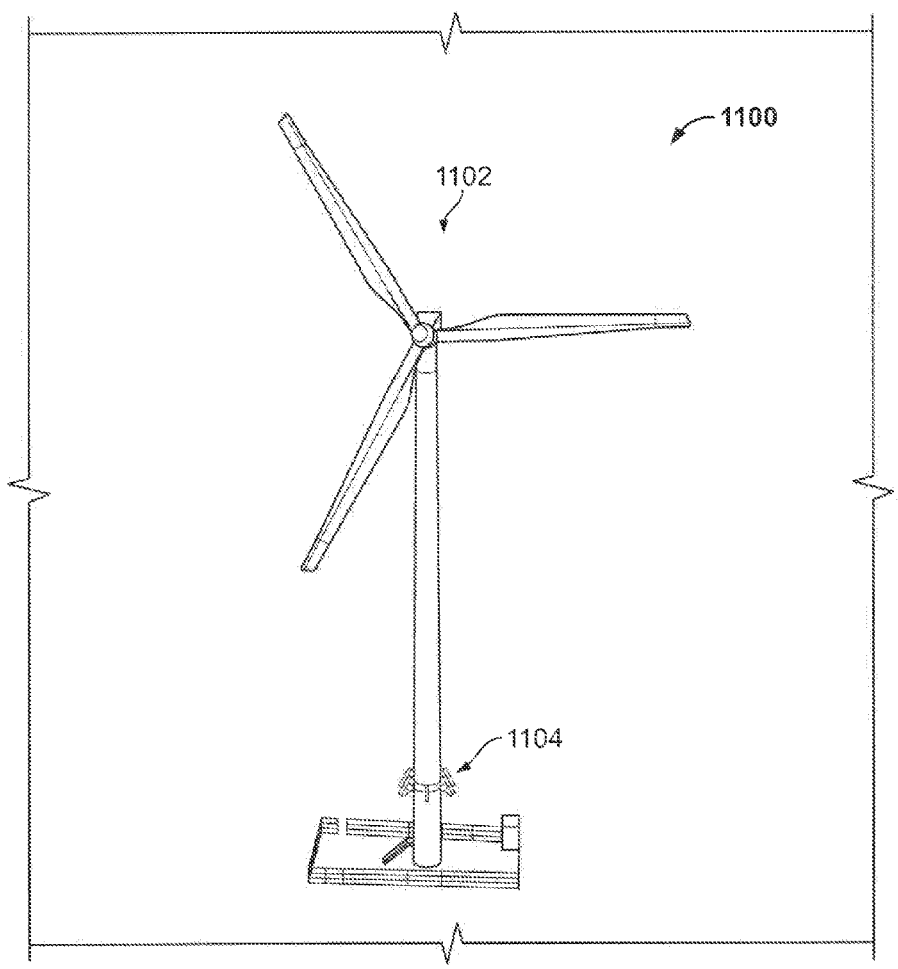
FIG. 11 illustrates an exemplary installation of the animal collision avoidance system within a wind farm according to an exemplary embodiment of the present disclosure.

Exemplary Installation of the Animal Collision Avoidance System within a Wind Farm FIG. 11 illustrates an exemplary installation of the animal collision avoidance system within a wind farm according to an exemplary embodiment of the present disclosure. An animal collision avoidance system 1104 provides one or more electronically generated deterrent signals to deter an object from a wind farm 1100 and/or to divert a trajectory of the object away from the wind farm 1100. The object can include one or more animals, one or more other objects other than animals, or any combination thereof. The animal collision avoidance system 1100 can represent an exemplary embodiment of the animal collision avoidance system 102.

As shown in FIG. 11, the wind farm 1100 includes one or more wind turbines 1102 for converting kinetic energy from wind, also called wind energy, into mechanical energy that is used to produce electricity. The animal collision avoidance system 1104 can be attached directly, or sufficiently proximate, to the one or more wind turbines 1102, to deter and/or to divert an animal, such as a bird or a bat to provide some examples. The animal collision avoidance system 1104 can provide various electronically generated acoustic sounding signals, such as those described in FIG. 5 through FIG. 8, various electronically generated lighting signals, such as those described in FIG. 9, and/or various electronically generated sonic signals, such as those described in FIG. 10A and FIG. 10B, to deter and/or to divert the animal.

FIG. 12 further illustrates the animal collision avoidance system that can be installed within a wind turbine according to an exemplary embodiment of the present disclosure. An animal collision avoidance system 1200 provides one or more electronically generated deterrent signals to deter an object from a wind farm, such as the wind farm 1100, to provide an example, and/or to divert a trajectory of the object away from the wind farm. The object can include one or more animals, one or more other objects other than animals, or any combination thereof. The animal collision avoidance system 1100 can represent an exemplary embodiment of the animal collision avoidance system 102. The animal collision avoidance system 1200 can be mounted or attached onto a tower base 1202 of a wind turbine, such as the wind turbine 1102 to provide an example. The animal collision avoidance system 1200 can be attached to the tower base 1202 using stud welding or any other suitable means that will be apparent to those skilled in the relevant art(s) without departing from the spirit and scope of the present disclosure.

The animal collision avoidance system 1200 includes a detection module 1204 and a deterrence module 1206. The detection module 1204 recognizes a bird and/or a bat within the wind farm 1100 as described in FIG. 1 through FIG. 3. The detection module 106 includes one or more thermal imaging sensors 1208 to detect energy emitted from the bird and/or the bat within their fields of view. In an exemplary embodiment, the one or more thermal imaging sensors 1208 are mounted onto thermal sensor rotators that turn the one or more thermal imaging sensors 1208 in approximately 180° of the horizontal plane. In this exemplary embodiment, multiple thermal imaging sensors 1208 can be used to provide approximately 360° coverage around the wind turbine.

The deterrence module 1206 activates one or more deterrents to deter and/or divert the bird and/or the bat as described in FIG. 1 and FIG. 4 through FIG. 10B. The deterrence module 1206 can include one or more laser modules 1210 to substantially enclose the wind turbine 1102 within an electronically generated lighting signal to provide an example, to deter and/or to divert the bird from a zone proximate to the wind turbine 1102 as described in FIG. 1 and FIG. 9. In an exemplary embodiment, the one or more laser modules 1210 collectively include approximately 300 laser beams, each under approximately 5 mW, to substantially enclose the wind turbine with the electronically generated lighting signal.

The deterrence module 1206 can additionally include one or more sound transducers 1212 to divert and/or deter the bird in accordance with various electronically generated acoustic sounding signals as described FIG. 1 through FIG. 8. In an exemplary embodiment, the one or more sound transducers 1212 are capable of emitting sound intensity of approximately 112 dB at approximately 350 ft., for frequencies between approximately 300 Hz and approximately 6500 Hz at weather conditions involving wind speed of approximately 22 to approximately 34 mph.

The deterrence module 1206 can further include one or more sonic transducers 1214 to divert and/or deter the bat in accordance with various electronically generated sonic signals as described FIG. 1 and FIG. 10A through FIG. 10B. The one or more sonic transducers 1214 can produce high intensity sounds between approximate 4 kHz to approximately 7 kHz and/or between approximately 22 kHz to approximately 24 kHz. The deterrence module 1206 can include any combination of the one or more laser modules 1210, the one or more sound transducers 1212, and/or the one or more sonic transducers 1214.

Exemplary Installation of the Animal Collision Avoidance System within an Airport FIG. 13 illustrates an exemplary installation of the animal collision avoidance system within an airport according to an exemplary embodiment of the present disclosure. An airport 1300 includes one or more airport runways 1302.1 through 1302.$k$ that are used by aircraft, such as fixed-wing aircraft, helicopters, and/or blimps to provide some examples, for arrival and/or departure. Additionally, the airport 1300 can include a helipad, or water for arrival and/or departure, and often includes buildings such as control towers, hangars, and terminal buildings to provide some examples. Animal collision avoidance systems 1304.1 through 1304.$n$ provide one or more electronically generated deterrent signals to deter an object from the airport runways 1302.1 through 1302.$k$ and/or to divert a trajectory of the object away from the airport runways 1302.1 through 1302.$k$. The object can include one or more animals, one or more other objects other than animals, or any combination thereof. One or more of the animal collision avoidance systems 1304.1 through 1304.$n$ can represent an exemplary embodiment of the animal collision avoidance system 102.

In an exemplary embodiment, a first group of animal collision avoidance systems 1304.1 through 1304.$n$ can be positioned proximate to the airport runways 1302.1 through 1302.$k$ to deter a bird and/or a bat from the airport runways 1302.1 through 1302.$k$ or to divert a trajectory of the bird away from the airport runways 1302.1 through 1302.$k$. Some of the animal collision avoidance systems 1304.1 through 1304.$n$ can be placed in such a manner proximate to the airport runways 1302.1 through 1302.$k$ to deter the bird and/or the bat from entering ascending and descending paths of the aircraft as it arrives at and/or departs from the airport 1300. These units are configured to deter the bird and/or the bat as the aircraft accelerate on the airport runways 1302.1 through 1302.$k$ and/or descend towards the airport runways 1302.1 through 1302.$k$. Optionally, a second group of animal collision avoidance systems 1304.1 through 1304.$n$ can be positioned between the airport runways 1302.1 through 1302.$k$ to deter the bird and/or the bat from sheltering or habituating between the airport runways 1302.1 through 1302.$k$.

The animal collision avoidance systems 1304.1 through 1304.$n$ can provide various electronically generated acoustic sounding signals, such as those described in FIG. 1, and FIG. 5 through FIG. 8, various electronically generated lighting signals, such as those described in FIG. 1 and FIG. 9, various electronically generated sonic signals, such as those described in FIG. 1, FIG. 10A, and FIG. 10B, to deter and/or to divert the bird and/or the bat.

FIG. 14 further illustrates configuration and arrangement of various animal collision avoidance systems to proximate to various airport runways within the airport according to an exemplary embodiment of the present disclosure. Animal collision avoidance systems 1400.1 through 1400.$i$ can be positioned to be proximate to an airport runway 1402 of an airport, such as the airport 1300 to provide an example, to deter an animal, such as a bird or a bat to provide an example, from the airport runway 1402 or to divert a trajectory of the animal away from the airport runway 1402. The animal collision avoidance systems 1400.1 through 1400.$i$ can be positioned at various locations to be proximate to the airport runway 1402 in accordance with various Federal Aviation Administration (FAA) regulations and/or other local regulations. The various FAA regulations and/or the other local regulations ensure the animal collision avoidance systems 1400.1 through 1400.$i$ are at safe distances from the airport runway 1402 so as not to substantially interfere with operation of aircraft. The animal collision avoidance systems 1400.1 through 1400.$i$ and the airport runway 1402 can represent exemplary embodiments of the animal collision avoidance systems 1304.1 through 1304.$n$ and one of the airport runways 1302.1 through 1302.$k$, respectively.

The animal collision avoidance systems 1400.1 through 1400.$i$ scans portions of the airport runway 1402 within their respective fields of view 1404.1 through 1404.$i$ to detect the presence of the bird or the bat. After detection of the presence of the bird or the bat and determining its location within the airport runway 1402, the animal collision avoidance systems 1400.1 through 1400.*i* provide various electronically generated acoustic sounding signals 1404.1 through 1404.*i* to deter and/or to divert the bird and/or the bat. As illustrated in FIG. 14, the electronically generated acoustic sounding signals 1404.1 through 1404.*i* overlap adjacent electronically generated acoustic sounding signals 1404.1 through 1404.*i* allow the animal collision avoidance systems 1400.1 through 1400.*i* to deter and/or to divert the bird and/or the bat from the airport runway 1402. For example, the electronically generated acoustic sounding signal 1404.2 that corresponds to the animal collision avoidance system 1400.2 overlaps the electronically generated acoustic sounding signal 1404.1 that corresponds to the animal collision avoidance system 1400.1 and the electronically generated acoustic sounding signal that corresponds to the animal collision avoidance system 1400.*i*.

FIG. 15 further illustrates one of the animal collision avoidance systems that can be installed within the airport according to an exemplary embodiment of the present disclosure. An animal collision avoidance system 1500 provides one or more electronically generated deterrent signals to deter an object from an airport, such as the airport 1300, to provide an example, and/or to divert a trajectory of the object away from the airport. The object can include one or more animals, one or more other objects other than animals, or any combination thereof. The animal collision avoidance system 1500 can be mounted or attached onto a mounting base 1502 which is coupled to a ground footing in a fixed location to be proximate to the airport runway using certified safety fuse bolts or any other suitable means that will be apparent to those skilled in the relevant art(s) without departing from the spirit and scope of the present disclosure. The animal collision avoidance system 1500 can represent an exemplary embodiment of the animal collision avoidance system 102.

The animal collision avoidance system 1500 includes a detection module 1504 and a deterrence module 1510. The detection module 1504 recognizes a bird and/or a bat within the airport runway as described in FIG. 1 through FIG. 3. The detection module 1504 includes a stereo detection module 1506 to detect energy emitted from the bird and/or the bat within its field of view. In an exemplary embodiment, the stereo detection module 1506 includes one or more cameras that are capable of operating in a low light environment for identifying movement of the bird and/or the bat along a Cartesian coordinate system. The detection module 1504 can optionally include an infra-red (IR) emission module 1508 for illuminating the field of view of the detection module 1504 in the case that airport ambient light needs to be aided for better identification of the bird and/or the bat.

The deterrence module 1510 activates one or more electronically generated deterrent signals to deter and/or divert the bird and/or the bat as described in FIG. 1 and FIG. 4 through FIG. 10B. The deterrence module 1510 can include an acoustic module with positioning capability. The acoustic module includes an acoustic system that is capable of directing electronically generated deterrent signals at the bird and/or the bat using positioning information from the stereo detection module 1506. Additionally, the deterrence module 1510 can be automatically deactivated when a person is detected within the field of view of the detection module 1504.

The animal collision avoidance system 1500 can optionally include a radio frequency (RF) communication module 1512 to wirelessly communicate information, such as commands and/or data to provide some examples, between the animal collision avoidance system 1500 and a remote Environmental Data Center or between the animal collision avoidance system 1500 and other animal collision avoidance systems. Alternatively, or in addition to, the animal collision avoidance system 1500 can communicate with a remote Environmental Data Center and/or the other animal collision avoidance systems using various wired communications.

Exemplary Networks of Animal Collision Avoidance Systems within the Exemplary Environments FIG. 16 illustrates a communicatively coupled network of animal collision avoidance systems according to an exemplary embodiment of the present disclosure. Generally, an animal collision avoidance system can be communicatively coupled to other animal collision avoidance systems and/or a remote Environmental Data Center to form a network of animal collision avoidance systems 1600. This coupling allows the animal collision avoidance system to communicate information, such as commands and/or data, between animal collision avoidance systems and/or the remote Environmental Data Center. The network of animal collision avoidance systems 1600 includes animal collision avoidance systems 1602.1 through 1602.*s* and a remote Environmental Data Center 1604 that are communicatively coupled via a communication network 1608. The network of animal collision avoidance systems 1600 can be implemented within a wind turbine, a wind farm, an airport runway, or a physical space next to airport runway, an oil sand site, an oil rig, a ship, farmland, an open pit mining site, a military base, an area of industrial hazard, a food storage facility, a chemical facility a golf course, a hospital, a building, a parking lot, and/or any other suitable environment that will be apparent to those skilled in the relevant art(s) without departing from the spirit and scope of the present disclosure.

The animal collision avoidance systems 1602.1 through 1602.*s* can include any suitable number of animal collision avoidance systems and typically depends upon the environment. For example, tens of animal collision avoidance systems 1602.1 through 1602.*s* can be used to deter and/or to divert an object from a wind farm whereas hundreds of animal collision avoidance systems 1602.1 through 1602.*s* can be used to deter and/or to divert the object from an airport. The animal collision avoidance systems 1602.1 through 1602.*s* can provide various electronically generated acoustic sounding signals, such as those described in FIG. 1, and FIG. 5 through FIG. 8, various electronically generated lighting signals, such as those described in FIG. 1 and FIG. 9, various electronically generated sonic signals, such as those described in FIG. 1, FIG. 10A, and FIG. 10B, to deter objects from the network of animal collision avoidance systems 1600 and/or to divert objects away from the network of animal collision avoidance systems 1600. The objects can include one or more animals, one or more other objects other than animals, or any combination thereof. In an exemplary embodiment, one of the animal collision avoidance systems 1602.1 through 1602.*s* can provide tracking information of an object within its field of view to assist animal collision avoidance systems 1602.1 through 1602.*s* in detecting the object as well as their tracking or following of the object as it approaches and/or enters their respective fields of view.

The animal collision avoidance systems 1602.1 through 1602.*s* can communicate information to each other as well as to the remote Environmental Data Center 1604. For example, one or more of the animal collision avoidance systems 1602.1 through 1602.*s* can provide an image, a video, and/or audio of the object within their fields of view and optionally, motion parameters and/or characteristics of the object, to one another and/or the remote Environmental Data Center 1604 for analysis. This can occur, for example, when one of the animal collision avoidance systems 1602.1 through 1602.s is unable to recognize the object within its field of view.

The remote Environmental Data Center 1604 controls overall configuration and/or operation of the animal collision avoidance systems 1602.1 through 1602.s. Engineers within the remote Environmental Data Center 1604 can monitor performance of the animal collision avoidance systems 1602.1 through 1602.s. For example, the remote Environmental Data Center 1604 can receive images, videos, and/or audio of objects within fields of view of the animal collision avoidance systems 1602.1 through 1602.s and optionally, motion parameters and/or characteristics of the objects for which the animal collision avoidance systems 1602.1 through 1602.s are unable to recognize. In this situation, the engineers within the remote Environmental Data Center can independently analyze the images, the videos, and/or the audio of the objects as well as the motion parameters and/or the characteristics of the objects to independently recognize the objects. The remote Environmental Data Center can then update motion parameters and/or characteristics used by the animal collision avoidance systems 1602.1 through 1602.s to enable the animal collision avoidance systems 1602.1 through 1602.s these newly recognized objects in the future.

As another example, the remote Environmental Data Center 1604 can remotely configure various deterrents used by the animal collision avoidance systems 1602.1 through 1602.s such as the various electronically generated acoustic sounding signals, the various electronically generated lighting signals, and/or the various electronically generated sonic signals that are used by the used by the animal collision avoidance systems 1602.1 through 1602.s to deter and/or to divert the object. For example, the remote Environmental Data Center 1604 can re-configure various intervals of the electronically generated acoustic sounding signals as well as the synthetic sounding signals within each interval, the laser modules, as well as lasers within the laser modules, which generate the electronically generated lighting signals, and/or the sonic transducers that generate the electronically generated sonic signals. As another example, the remote Environmental Data Center 1604 can provide information to the animal collision avoidance systems 1602.1 through 1602.s for use in deterring and/or to diverting any newly discovered objects.

The communication network 1608 communicatively couples the animal collision avoidance systems 1602.1 through 1602.s and remote Environmental Data Center 1604. The communication network 1608 can include any suitable wireless communication network, such as a cellular network to provide an example, any suitable wired communication network, such as a fiber optic network or cable network to provide some examples, or any combination of wireless and wired communication networks.

CONCLUSION

It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. A wind turbine within a wind farm, comprising:
   a plurality of blades configured to convert kinetic energy from wind into mechanical energy that is used to produce electricity; and
   an animal collision avoidance system configured to electronically produce, upon recognition of a bird, an electronically generated acoustic sounding signal between approximately 300 Hz and 6,500 Hz, the acoustic sounding signal as delivered to within approximately 3.3 feet of an ear of the recognized bird having a rise time from a first power level to a second power level within a maximum acoustic startle response rise time, wherein the change in power level is approximately 112 dB;
   wherein the electronically generated acoustic sounding signal induces an acoustic startle reflex (ASR) of the bird to deter the bird from the wind farm or to divert a trajectory of the bird away from the wind farm.

2. The wind turbine of claim 1, wherein the animal collision avoidance system comprises:
   a detection module configured to sweep its field of view within the wind farm to detect a presence of an object and to recognize the object within its field of view as being the bird.

3. The wind turbine of claim 2, wherein the detection module is farther configured to recognize the bird when a motion parameter or a characteristic of the object is substantially similar to a known motion parameter corresponding to the bird or a known characteristic corresponding to the bird.

4. The wind turbine of claim 1, wherein the animal collision avoidance system comprises:
   a deterrence module configured to provide the electronically generated acoustic sounding signal; and
   wherein the maximum acoustic startle response rise time of the recognized bird is approximately 30 ms.

5. The wind turbine of claim 4, wherein the deterrence module is further configured to provide a sequential repetition of the synthetic sounding signal with a silence interval between repetitions as the electronically generated acoustic sounding signal to induce the ASR of the bird.

6. The wind turbine of claim 4, wherein the electronically generated acoustic sounding signal further comprises:
   a plurality of electronically generated modulation sounds, wherein the deterrence module is further configured to sequence the synthetic sounding signal and the plurality of electronically generated modulation sounds to provide the electronically generated acoustic sounding signal to amplify the ASR of the bird through inducement of modulation by attention or modulation by emotion.

7. The wind turbine of claim 1, wherein the animal collision avoidance system is further configured to electronically produce an electronically generated sonic signal, upon recognition of a bat, to deter the bat from entering into a zone proximate to the wind turbine or to divert a trajectory of the bat away from the zone.

8. The wind turbine of claim 7, wherein the electronically generated sonic signal is characterized as being within a first frequency range of approximately 4 kHz to approximately 7 kHz or a second frequency range of approximately 22 kHz to approximately 24 kHz.

9. A plurality of animal collision avoidance systems for use in an airport, comprising:
a plurality of detection modules configured to scan their fields of view within the airport to detect a presence of an object and to recognize the object within their fields of view as being a bird; and
a plurality of deterrence modules configured to electronically produce a plurality of electronically generated acoustic sounding signals, upon recognition of the bird, to induce an acoustic startle reflex (ASR) of the bird to deter the bird from an airport runway or to divert a trajectory of the bird away from the airport runway;
wherein the electronically generated acoustic sounding signal is between approximately 300 Hz and 6,500 Hz, the acoustic sounding signal as delivered to within approximately 3.3 feet of an ear of the recognized bird within a maximum acoustic startle response rise time, and wherein the change in power level is approximately 12 dB.

10. The plurality of animal collision avoidance systems of claim 9, wherein a first group of plurality of animal collision avoidance systems is positioned to be proximate to an airport runway, and wherein a second group of the plurality of animal collision avoidance systems is configured to deter the bird from entering ascending and/or descending paths of aircraft as the aircraft arrives at or departs from the airport.

11. The plurality of animal collision avoidance systems of claim 10, wherein the plurality of detection modules are further configured to determine a motion parameter and a location of the bird upon its recognition, and
wherein the plurality of deterrence modules are further configured to compensate for motion of the object as indicated by the motion parameter from the location when directing the plurality of electronically generated acoustic sounding signals toward the bird.

12. The plurality of animal collision avoidance systems of claim 9, wherein a first electronically generated acoustic sounding signal of a first animal collision avoidance system from among the plurality of animal collision avoidance systems is configured to overlap a second electronically generated acoustic sounding signal of a second animal collision avoidance system from among the plurality of animal collision avoidance systems and a third electronically generated acoustic sounding signal of a third animal collision avoidance system from among the plurality of animal collision avoidance systems.

13. The plurality of animal collision avoidance systems of claim 9, wherein the electronically generated acoustic sounding signal is selected from among a plurality of electronically generated acoustic sounding signals, the plurality of electronically generated acoustic sounding signals being specifically tailored to different taxonomic ranks for birds,
wherein the detection module is further configured to recognize a taxonomic order of the bird, and
wherein the deterrence module is further configured to select the electronically generated acoustic sounding signal from among the plurality of electronically generated acoustic sounding signals that corresponds to the taxonomic rank of the bird.

14. The plurality of animal collision avoidance systems of claim 9, wherein the plurality of animal collision avoidance systems are coupled to a plurality of ground footings in a plurality of fixed locations that are proximate to the airport runway.

15. A network of animal collision avoidance systems, comprising:
a plurality of animal collision avoidance systems configured to electronically produce an electronically generated deterrent signal upon recognition of an object within an environment, to deter the object from an environment or to divert a trajectory of the object away from the environment; and
a remote Environmental Data Center, communicatively coupled to the plurality of animal collision avoidance systems via a communication network, configured to control operation of the plurality of animal collision avoidance systems;
wherein the electronically generated deterrent signal is between approximately 300 Hz and 6,500 Hz, the acoustic sounding signal as delivered to within approximately 3.3 feet of an ear of the bird having a rise time from a first power level to a second power level within a maximum acoustic startle response rise time, wherein the change in power level is approximately 112 dB.

16. The network of animal collision avoidance systems of claim 15, wherein an animal collision avoidance system from among the plurality of animal collision avoidance systems is configured to provide an image, a video, or audio of the object within a field of view of the animal collision avoidance system to the remote Environmental Data Center when the animal collision avoidance system is unable to recognize the object, and
wherein the remote Environmental Data Center is configured to analyze the image, the video, or the audio to recognize the object and to provide an update to the animal collision avoidance system to allow the animal collision avoidance system to recognize the object in the future.

17. The network of animal collision avoidance systems of claim 15, wherein the electronically generated deterrent signal comprises:
an electronically generated acoustic sounding signal configured to induce an acoustic startle reflex (ASR) of the object;
an electronically generated lighting signal configured to substantially enclose a zone within the environment to deter the object from entering into the zone and/or to divert a trajectory of the object away from the zone; or
an electronically generated sonic signal configured to substantially enclose a zone within the environment to deter the object from entering into the zone and/or to divert a trajectory of the object away from the zone.

18. The network of animal collision avoidance systems of claim 15, wherein the electronically generated deterrent signal is selected from among a plurality of electronically generated deterrent signals, the plurality of electronically generated deterrent signals being specifically tailored to different objects, and
wherein remote Environmental Data Center is configured to remotely update the plurality of electronically generated deterrent signals.

19. The network of animal collision avoidance systems of claim 15, wherein the plurality of animal collision avoidance systems are configured to recognize a taxonomic rank of the object and to select an electronically generated deterrent signal corresponding to the taxonomic rank of the object from among a plurality of electronically generated deterrent signals, the plurality of electronically generated acoustic sounding signals being specifically tailored to different taxonomic ranks.

20. An animal collision avoidance system, comprising:
a detection module configured to detect for a presence of an object within an environment and to recognize a taxonomic rank of the object; and
a deterrence module configured to electronically produce an electronically generated acoustic sounding signal, upon recognition of the taxonomic rank, to induce an acoustic startle reflex (ASR) of the object to deter the object from entering into the environment;
wherein the electronically generated acoustic sounding signal is between approximately 300 Hz and 6,500 Hz, the acoustic sounding signal as delivered to within approximately 3.3 feet of an ear of the object having a rise time from a first rower level to a second power level within a maximum acoustic startle response rise time, and wherein the chance in power level is approximately 112 dB.

21. The animal collision avoidance system of claim 20, wherein the detection module is further configured to recognize the taxonomic rank when a motion parameter or a characteristic of the object is substantially similar to a known motion parameter or a known characteristic that corresponds to the taxonomic rank.

22. The animal collision avoidance system of claim 21, wherein the known motion parameter or the known characteristic is selected from a plurality of motion parameters and a plurality of characteristics, respectively, the plurality of motion parameters and the plurality of characteristics being stored in a plurality of databases,
wherein a first database from among the plurality of databases is configured to include information about a plurality of possible types of taxonomic ranks that are able to be found within the environment, and
wherein a second database from among the plurality of databases is configured to include the plurality of motion parameters and the plurality of characteristics of the plurality of possible types of taxonomic ranks that are able to be found within the environment.

23. The animal collision avoidance system of claim 20, wherein the electronically generated acoustic sounding signal comprises:
a synthetic sounding signal configured to have a sufficient rise time from a first power level to a second power to induce the ASR of the taxonomic rank.

24. The animal collision avoidance system of claim 20, wherein the deterrence module is further configured to provide a sequential repetition of the synthetic sounding signal with a silence interval between repetitions as the electronically generated acoustic sounding signal to induce the ASR of the taxonomic rank.

25. The animal collision avoidance system of claim 20, wherein the electronically generated acoustic sounding signal is configured to not substantially affect stress level or well-being of the taxonomic rank.

* * * * *